(12) United States Patent
Wang et al.

(10) Patent No.: US 12,210,446 B2
(45) Date of Patent: Jan. 28, 2025

(54) INTER-CLUSTER SHARED DATA MANAGEMENT IN SUB-NUMA CLUSTER

(71) Applicant: Intel Corporation, Santa Clara, CA (US)

(72) Inventors: Zhe Wang, Portland, OR (US); Lingxiang Xiang, Santa Clara, CA (US); Christopher J. Hughes, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 18/284,265

(22) PCT Filed: Jun. 21, 2021

(86) PCT No.: PCT/US2021/038235
§ 371 (c)(1),
(2) Date: Sep. 26, 2023

(87) PCT Pub. No.: WO2022/271143
PCT Pub. Date: Dec. 29, 2022

(65) Prior Publication Data
US 2024/0152448 A1    May 9, 2024

(51) Int. Cl.
*G06F 12/00*     (2006.01)
*G06F 9/30*      (2018.01)
*G06F 12/02*     (2006.01)
*G06F 12/0811*   (2016.01)

(52) U.S. Cl.
CPC ........ *G06F 12/023* (2013.01); *G06F 9/30036* (2013.01); *G06F 9/30038* (2023.08); *G06F 12/0811* (2013.01)

(58) Field of Classification Search
None
See application file for complete search history.

(56) References Cited

U.S. PATENT DOCUMENTS

| | | | |
|---|---|---|---|
| 7,149,863 B1 * | 12/2006 | Chew | G06F 9/5016 711/170 |
| 7,302,533 B2 | 11/2007 | Finnie et al. | |
| 9,396,047 B2 | 7/2016 | Nightingale et al. | |

(Continued)

OTHER PUBLICATIONS

International Search Report and Written Opinion from PCT/US2021/038235 notified Mar. 10, 2022, 11 pgs.

(Continued)

*Primary Examiner* — Daniel D Tsui
(74) *Attorney, Agent, or Firm* — Essential Patents Group, LLP

(57) ABSTRACT

An embodiment of an integrated circuit may comprise circuitry communicatively coupled to two or more sub-non-uniform memory access clusters (SNCs) to allocate a specified memory space in the two or more SNCs in accordance with a SNC memory allocation policy indicated from a request to initialize the specified memory space. An embodiment of an apparatus may comprise decode circuitry to decode a single instruction, the single instruction to include a field for an opcode, and execution circuitry to execute the decoded instruction according to the opcode to provide an indicated SNC memory allocation policy (e.g., a SNC policy hint). Other embodiments are disclosed and claimed.

20 Claims, 14 Drawing Sheets

(56) References Cited

U.S. PATENT DOCUMENTS

| | | |
|---|---|---|
| 9,886,313 B2 | 2/2018 | Wagle et al. |
| 10,868,742 B2 | 12/2020 | Chitalia et al. |
| 2014/0330851 A1* | 11/2014 | Sarkar ............... G06F 9/445 707/756 |
| 2016/0357442 A1* | 12/2016 | Ninomiya ........... G06F 3/0647 |
| 2020/0294182 A1 | 9/2020 | George et al. |

OTHER PUBLICATIONS

International Preliminary Report on Patentability from PCT/US2021/038235 notified Jan. 4, 2024, 8 pgs.

* cited by examiner

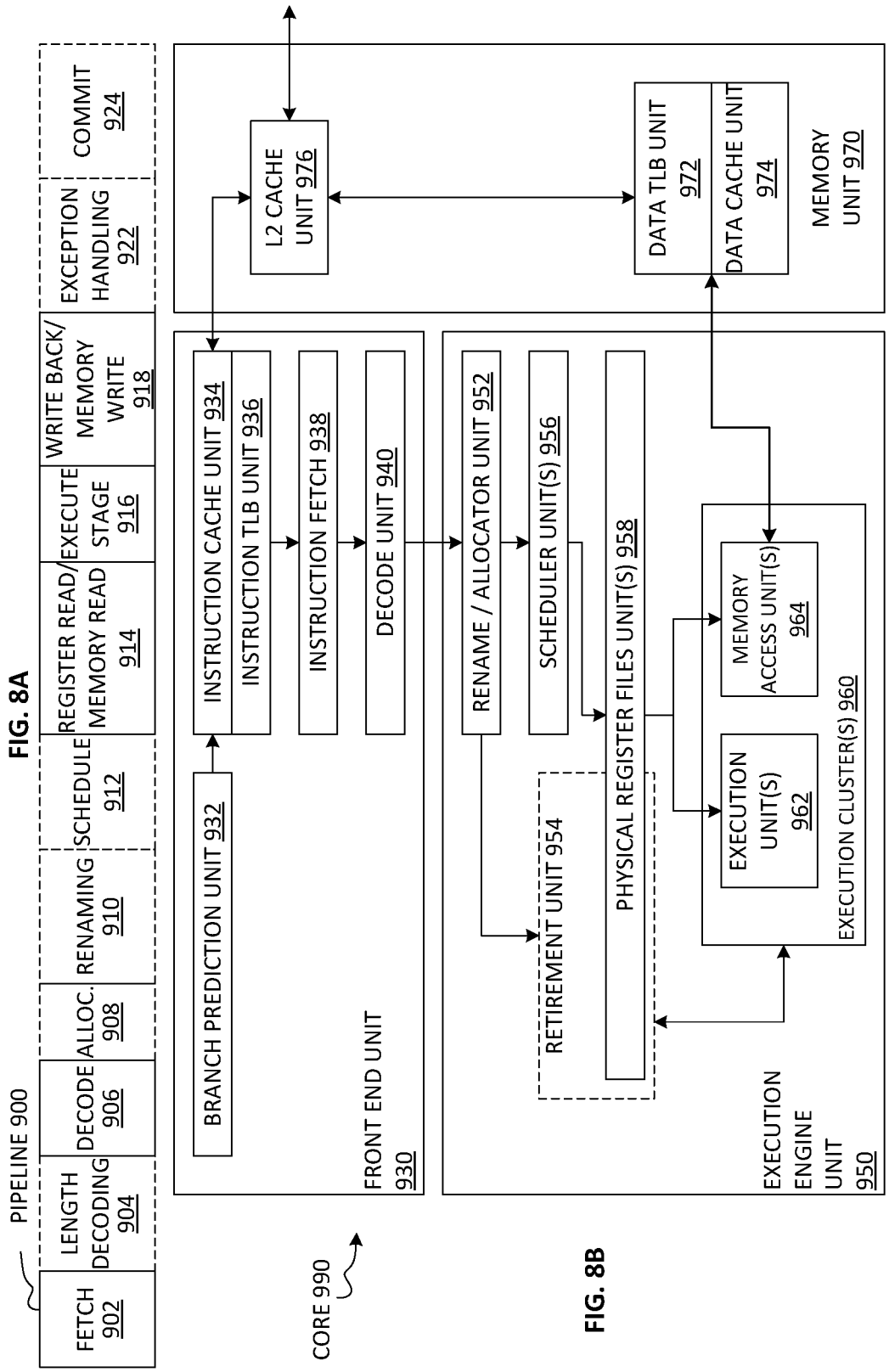

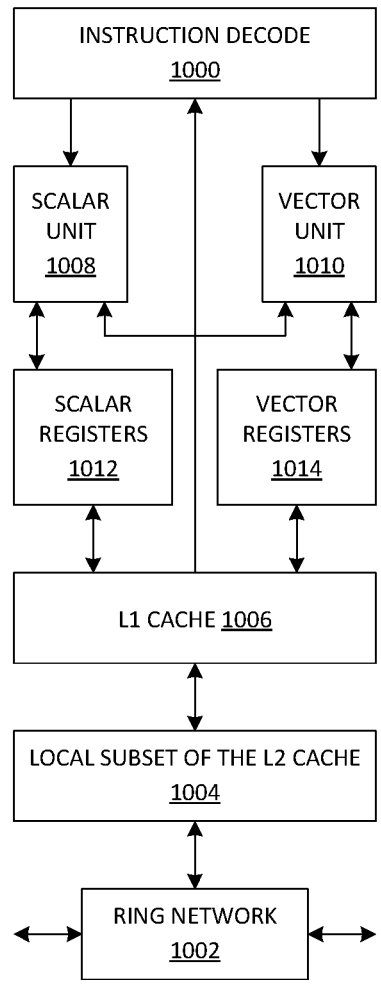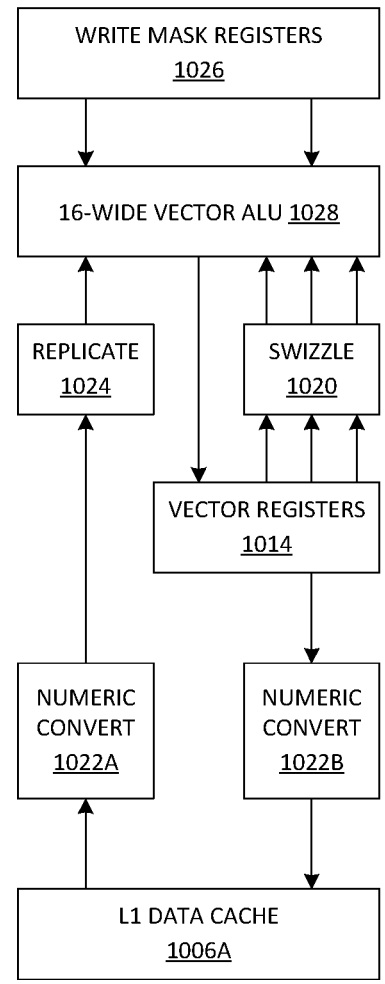
FIG. 9A
FIG. 9B

INTER-CLUSTER SHARED DATA MANAGEMENT IN SUB-NUMA CLUSTER

CLAIM OF PRIORITY

This Application is a National Stage Entry of, and claims priority to, PCT Application No. PCT/US2021/038235, filed on Jun. 16, 2021 and titled "INTER-CLUSTER SHARED DATA MANAGEMENT IN SUB-NUMA CLUSTER," which is incorporated by reference in its entirety for all purposes.

BACKGROUND

1. Technical Field

This disclosure generally relates to processor technology, and memory cluster technology.

2. Background Art

Non-uniform memory access (NUMA) is a computer memory design used in multiprocessing, where the memory access time depends on the memory location relative to the processor. Under NUMA, a processor can access its own local memory faster than non-local memory (memory local to another processor or memory shared between processors). The benefits of NUMA are limited to particular workloads, notably on servers where the data is often associated strongly with certain tasks or users.

Some processors/servers may include features to support a sub-NUMA cluster (SNC). A SNC may divide the cores, cache, and memory of the processor into multiple NUMA domains. In some systems, SNC(s) may increase performance for workloads that are NUMA aware and optimized. A SNC may be similar to a cluster-on-die (COD) feature in some processors/servers, though there are some differences between the two. A SNC creates two localization domains within a processor by mapping addresses from one of the local memory controllers in one half of the last-level cache (LLC) slices closer to that memory controller and addresses mapped to the other memory controller into the LLC slices in the other half. Through this address-mapping mechanism, processes running on cores on one of the SNC domains using memory from the memory controller in the same SNC domain observe lower LLC and memory latency compared to latency on accesses mapped to locations outside of the same SNC domain.

Unlike a COD mechanism where a cache line could have copies in the LLC of each cluster, SNC has a unique location for every address in the LLC, and the unique location is never duplicated within the LLC banks. Also, localization of addresses within the LLC for each SNC domain applies only to addresses mapped to the memory controllers in the same socket. All addresses mapped to memory on remote sockets are uniformly distributed across all LLC banks independent of the SNC mode. Therefore, even in the SNC mode, the entire LLC capacity on the socket is available to each core, and the LLC capacity reported through the CPUID is not affected by the SNC mode.

BRIEF DESCRIPTION OF THE DRAWINGS

The various embodiments of the present invention are illustrated by way of example, and not by way of limitation, in the figures of the accompanying drawings and in which:

FIG. 8A is a block diagram illustrating both an exemplary in-order pipeline and an exemplary register renaming, out-of-order issue/execution pipeline according to embodiments of the invention.

FIG. 8B is a block diagram illustrating both an exemplary embodiment of an in-order architecture core and an exemplary register renaming, out-of-order issue/execution architecture core to be included in a processor according to embodiments of the invention;

FIGS. 9A-B illustrate a block diagram of a more specific exemplary in-order core architecture, which core would be one of several logic blocks (including other cores of the same type and/or different types) in a chip;

DETAILED DESCRIPTION

Figure 1:
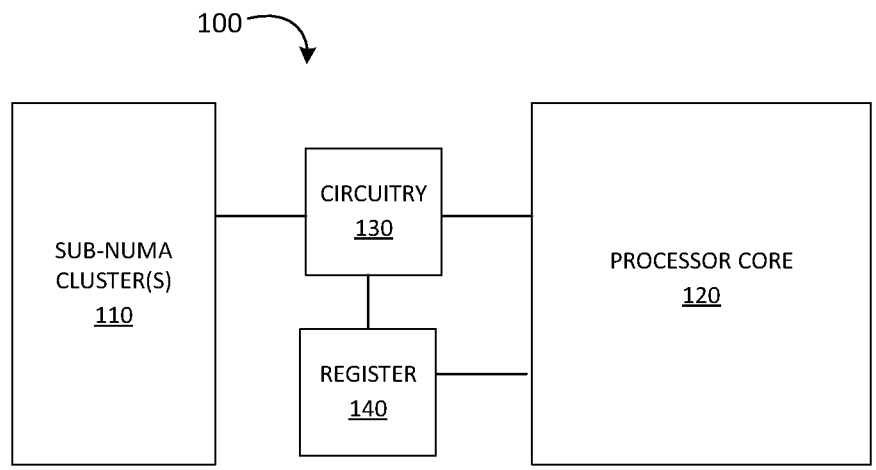
FIG. 1 is a block diagram of an example of a system according to an embodiment.

Embodiments discussed herein variously provide techniques and mechanisms for inter-cluster shared data management in sub-non-uniform memory access (sub-NUMA) clusters (SNCs). The technologies described herein may be implemented in one or more electronic devices. Non-limiting examples of electronic devices that may utilize the technologies described herein include any kind of mobile device and/or stationary device, such as cameras, cell phones, computer terminals, desktop computers, electronic readers, facsimile machines, kiosks, laptop computers, netbook computers, notebook computers, internet devices, payment terminals, personal digital assistants, media players and/or recorders, servers (e.g., blade server, rack mount server, combinations thereof, etc.), set-top boxes, smart phones, tablet personal computers, ultra-mobile personal computers, wired telephones, combinations thereof, and the like. More generally, the technologies described herein may be employed in any of a variety of electronic devices including integrated circuitry which is operable to provide a SNC memory allocation policy hint together with a request to allocate memory space in the SNC.

In the following description, numerous details are discussed to provide a more thorough explanation of the embodiments of the present disclosure. It will be apparent to one skilled in the art, however, that embodiments of the present disclosure may be practiced without these specific details. In other instances, well-known structures and devices are shown in block diagram form, rather than in detail, in order to avoid obscuring embodiments of the present disclosure.

Note that in the corresponding drawings of the embodiments, signals are represented with lines. Some lines may be thicker, to indicate a greater number of constituent signal paths, and/or have arrows at one or more ends, to indicate a direction of information flow. Such indications are not intended to be limiting. Rather, the lines are used in connection with one or more exemplary embodiments to facilitate easier understanding of a circuit or a logical unit. Any represented signal, as dictated by design needs or preferences, may actually comprise one or more signals that may travel in either direction and may be implemented with any suitable type of signal scheme.

Throughout the specification, and in the claims, the term "connected" means a direct connection, such as electrical, mechanical, or magnetic connection between the things that are connected, without any intermediary devices. The term "coupled" means a direct or indirect connection, such as a direct electrical, mechanical, or magnetic connection between the things that are connected or an indirect connection, through one or more passive or active intermediary devices. The term "circuit" or "module" may refer to one or more passive and/or active components that are arranged to cooperate with one another to provide a desired function. The term "signal" may refer to at least one current signal, voltage signal, magnetic signal, or data/clock signal. The meaning of "a," "an," and "the" include plural references. The meaning of "in" includes "in" and "on."

The term "device" may generally refer to an apparatus according to the context of the usage of that term. For example, a device may refer to a stack of layers or structures, a single structure or layer, a connection of various structures having active and/or passive elements, etc. Generally, a device is a three-dimensional structure with a plane along the x-y direction and a height along the z direction of an x-y-z Cartesian coordinate system. The plane of the device may also be the plane of an apparatus which comprises the device.

The term "scaling" generally refers to converting a design (schematic and layout) from one process technology to another process technology and subsequently being reduced in layout area. The term "scaling" generally also refers to downsizing layout and devices within the same technology node. The term "scaling" may also refer to adjusting (e.g., slowing down or speeding up—i.e. scaling down, or scaling up respectively) of a signal frequency relative to another parameter, for example, power supply level.

The terms "substantially," "close," "approximately," "near," and "about," generally refer to being within +/−10% of a target value. For example, unless otherwise specified in the explicit context of their use, the terms "substantially equal," "about equal" and "approximately equal" mean that there is no more than incidental variation between among things so described. In the art, such variation is typically no more than +/−10% of a predetermined target value.

It is to be understood that the terms so used are interchangeable under appropriate circumstances such that the embodiments of the invention described herein are, for example, capable of operation in other orientations than those illustrated or otherwise described herein.

Unless otherwise specified the use of the ordinal adjectives "first," "second," and "third," etc., to describe a common object, merely indicate that different instances of like objects are being referred to and are not intended to imply that the objects so described must be in a given sequence, either temporally, spatially, in ranking or in any other manner.

The terms "left," "right," "front," "back," "top," "bottom," "over," "under," and the like in the description and in the claims, if any, are used for descriptive purposes and not necessarily for describing permanent relative positions. For example, the terms "over," "under," "front side," "back side," "top," "bottom," "over," "under," and "on" as used herein refer to a relative position of one component, structure, or material with respect to other referenced components, structures or materials within a device, where such physical relationships are noteworthy. These terms are employed herein for descriptive purposes only and predominantly within the context of a device z-axis and therefore may be relative to an orientation of a device. Hence, a first material "over" a second material in the context of a figure provided herein may also be "under" the second material if the device is oriented upside-down relative to the context of the figure provided. In the context of materials, one material disposed over or under another may be directly in contact or may have one or more intervening materials. Moreover, one material disposed between two materials may be directly in contact with the two layers or may have one or more intervening layers. In contrast, a first material "on" a second material is in direct contact with that second material. Similar distinctions are to be made in the context of component assemblies.

The term "between" may be employed in the context of the z-axis, x-axis or y-axis of a device. A material that is between two other materials may be in contact with one or both of those materials, or it may be separated from both of the other two materials by one or more intervening materials. A material "between" two other materials may therefore be in contact with either of the other two materials, or it may be coupled to the other two materials through an intervening material. A device that is between two other devices may be directly connected to one or both of those devices, or it may be separated from both of the other two devices by one or more intervening devices.

As used throughout this description, and in the claims, a list of items joined by the term "at least one of" or "one or more of" can mean any combination of the listed terms. For example, the phrase "at least one of A, B or C" can mean A; B; C; A and B; A and C; B and C; or A, B and C. It is pointed out that those elements of a figure having the same reference numbers (or names) as the elements of any other figure can operate or function in any manner similar to that described, but are not limited to such.

In addition, the various elements of combinatorial logic and sequential logic discussed in the present disclosure may pertain both to physical structures (such as AND gates, OR gates, or XOR gates), or to synthesized or otherwise optimized collections of devices implementing the logical structures that are Boolean equivalents of the logic under discussion.

Some embodiments may provide technology for intercluster shared data management in sub-NUMA clustering. In a conventional SNC system, control over the placement of data during initialization of the data is limited. By default, hardware places the data in the first NUMA cluster/node that touches the data. This placement policy may lead to a situation where data is unevenly distributed across the clusters that access the data during the real computation, possibly even with all the data assigned to a single cluster. Such unevenly distributed data may cause inefficiency for heavily inter-cluster shared data in two ways. First, for a level-three (L3) cache organized as a SNC, unevenly distributed inter-cluster shared data will not utilize the full capacity of the L3 cache, which potentially results in a higher cache miss rate. Second, because accesses are redirected to the owner cluster for each piece of data, an uneven ownership distribution leads to traffic congestion, which results in larger access latency and lower mesh/cache bandwidth utilization.

Cluster-on-die (CoD) technology in some processors may effectively split a single shared L3 cache into multiple L3 caches, with one L3 cache per cluster. Hardware supplicates read-shared data in each of the L3 caches, that localizes subsequent accesses to the shared data because each core will hit in its own L3 cache. CoD duplicates data shared by multiple clusters, however, thereby consuming additional L3 capacity and potentially increasing a cache miss rate. CoD technology also requires maintaining coherence between the multiple clusters, which adds complexity to the L3 cache design.

Some systems may include an interleaved memory setting, which may be set at runtime. In some systems, the interleave setting allows all the pages allocated during runtime to be placed in an interleaved fashion across different NUMA clusters. Once set, the interleaved memory setting applies page interleaving placement for all data allocated during runtime. A problem is that the setting may hurt performance if a subset of data in a program prefers a first touch allocation (e.g., the data will only be accessed by a single cluster). Some embodiments overcome one or more of the foregoing problems with technology to guide hardware that supports SNC to place shared data more efficiently.

With reference to FIG. 1, an embodiment of a system 100 may include two or more sub-non-uniform memory access (sub-NUMA) clusters (SNCs) 110, a processor core 120, and circuitry 130 communicatively coupled to the two or more SNCs 110 and the processor core 120. The circuitry 130 may be configured to allocate a specified memory space in the two or more SNCs 110 in accordance with a SNC memory allocation policy indicated from a request to initialize the specified memory space (e.g., a SNC policy hint that accompanies the request). For example, the system 100 may include a register 140 to store the indicated SNC memory allocation policy (e.g., a model specific register (MSR)). Alternatively, or additionally, the circuitry 130 may be configured to determine the indicated SNC memory allocation policy based on an instruction that triggered the request to initialize the specified memory space (e.g., a SNC-policy-hint instruction).

In some embodiments, the circuitry 130 may be further configured to override a default memory allocation policy for the two or more SNCs 110 with the indicated SNC memory allocation policy. For example, the circuitry 130 may be configured to determine if the indicated SNC memory allocation policy indicates that the specified memory space is to be interleaved and, if so determined, to allocate the specified memory space to be interleaved among all of the two or more SNCs 110. In some embodiments, the circuitry 130 may be configured to allocate the specified memory space to be interleaved among all of the two or more SNCs 110 at a page granularity. Alternatively, or additionally, the circuitry 130 may be configured to allocate the specified memory space to be interleaved among all of the two or more SNCs 110 at a block granularity.

Figure 14:
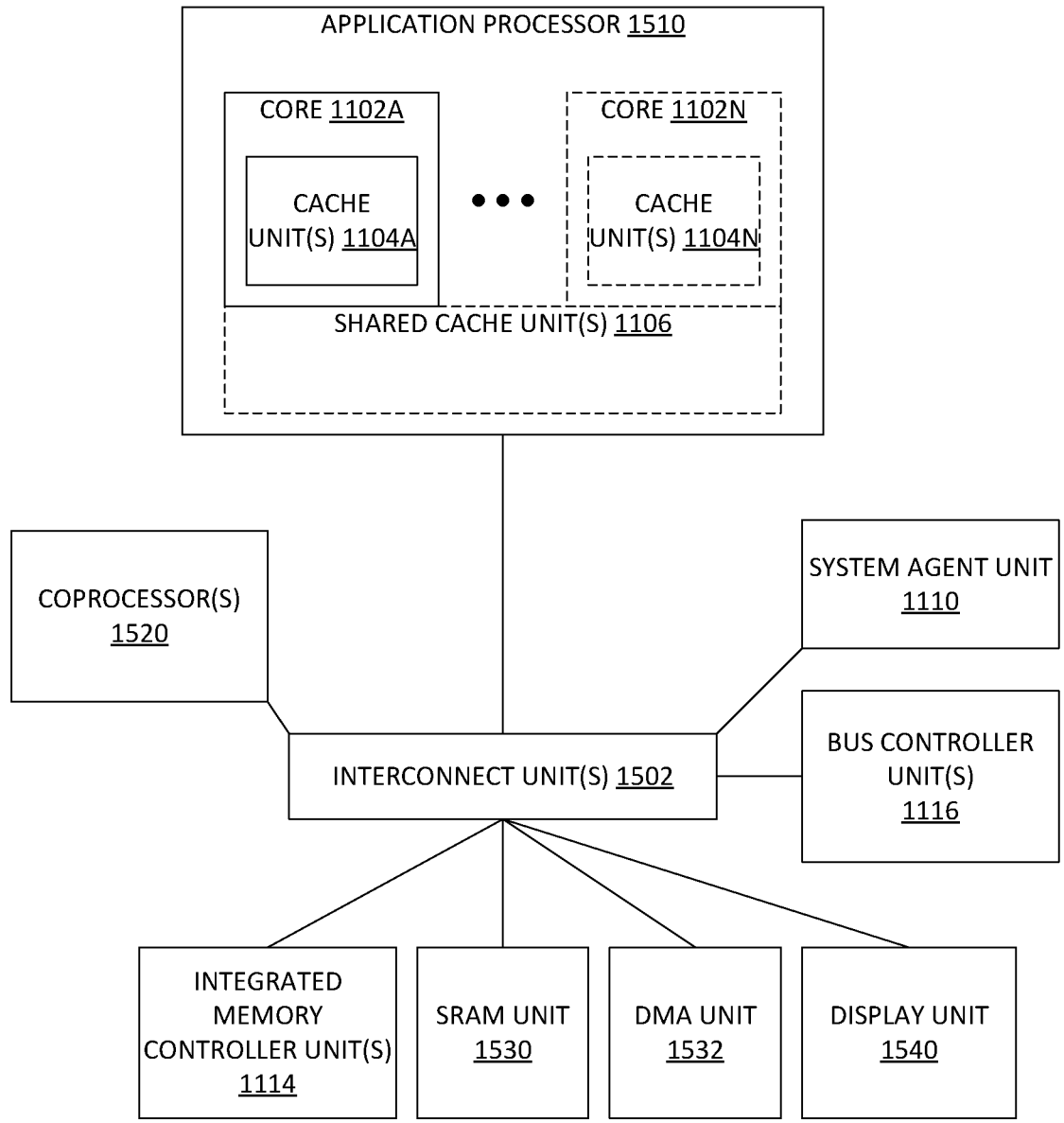
Figure 15:
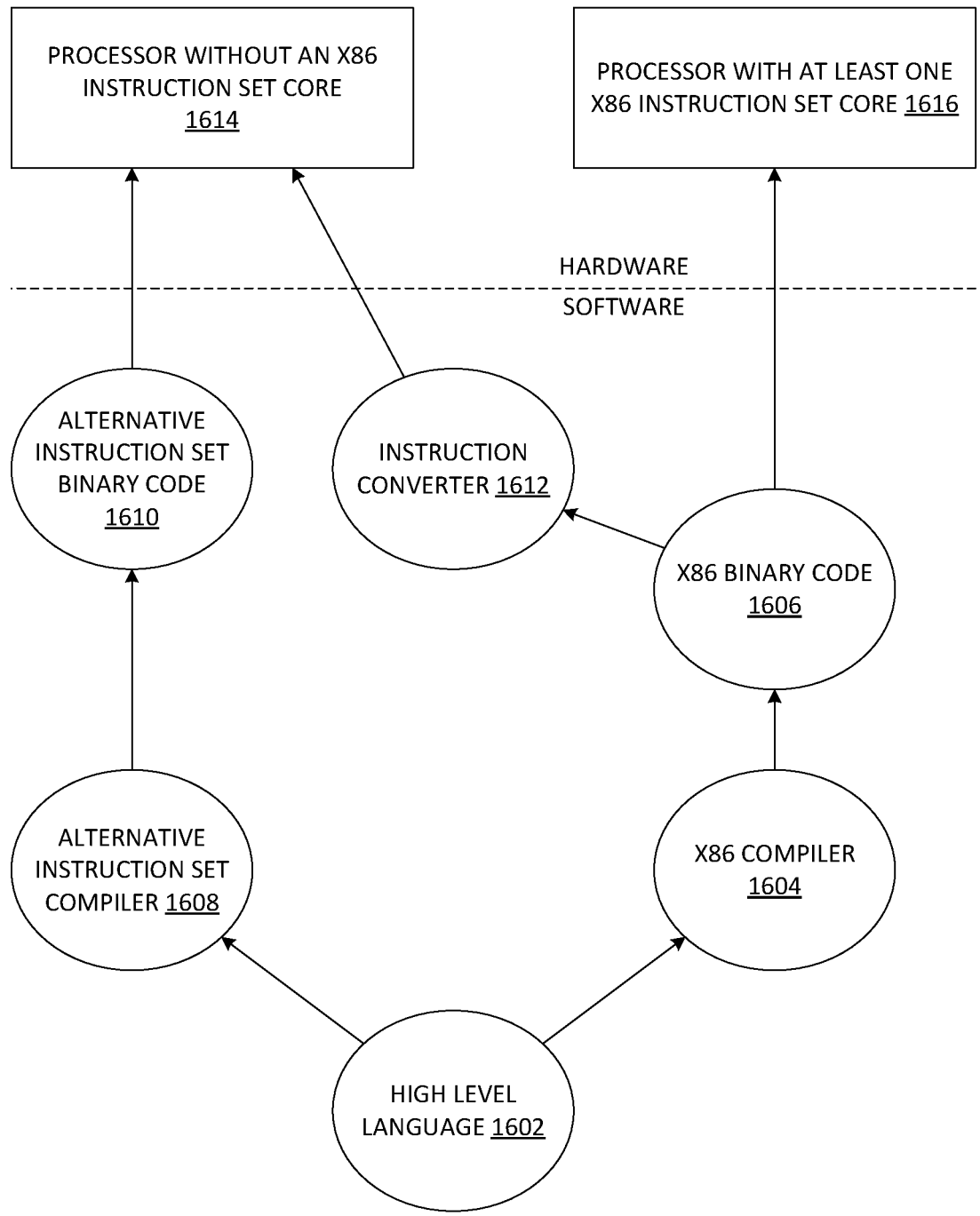
FIG. 15 is a block diagram contrasting the use of a software instruction converter to convert binary instructions in a source instruction set to binary instructions in a target instruction set according to embodiments of the invention.

Embodiments of the circuitry 130 may be integrated with any useful processor or controller. Non-limiting examples of suitable processors include the core 990 (FIG. 8B), the cores 1102A-N (FIGS. 10, 14), the processor 1210 (FIG. 11), the co-processor 1245 (FIG. 11), the processor 1370 (FIGS. 12-14), the processor/coprocessor 1380 (FIGS. 12-14), the coprocessor 1338 (FIG. 12), the processor 1315 (FIG. 12), the coprocessor 1520 (FIG. 14), and/or the processors 1614, 1616 (FIG. 15). Non-limiting examples of suitable controllers include the integrated memory controller unit(s) 1114 (FIG. 10), the GMCH 1290 (FIG. 11), the IMCs 1372 and 1382 (FIG. 12), the chipset 1390 (FIGS. 12 and 13), the control logic 1472 and 1482 (FIG. 13), and the interconnect unit(s) 1502 (FIG. 14).

Figure 2:
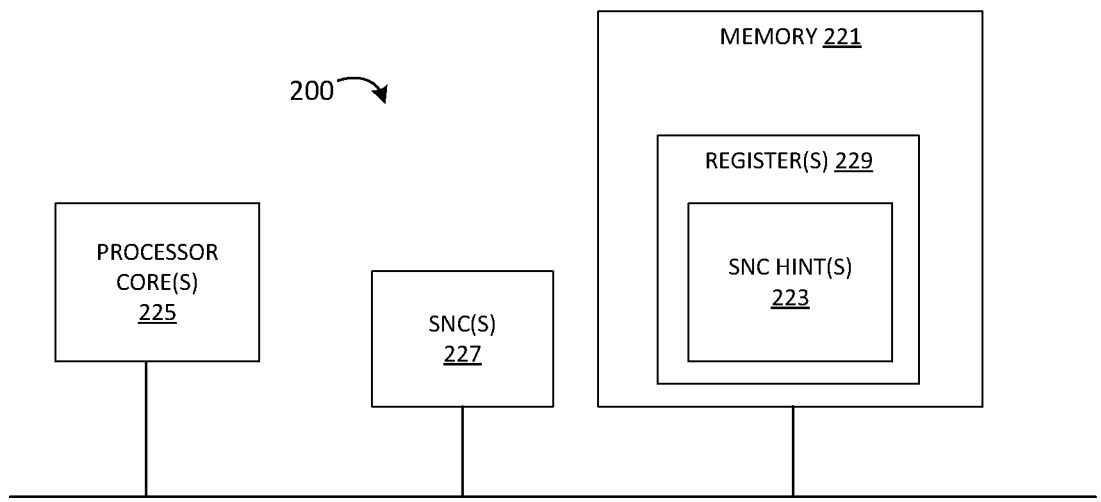
FIG. 2 is a block diagram of another example of a system according to an embodiment.

With reference to FIG. 2, an embodiment of a system 200 may include a memory 221 to store one or more SNC-hint data structures 223 associated with respective requests to initialize data, and one or more processor cores 225 communicatively coupled to the memory 221 to allocate a memory space in one or more SNCs 227 based on a SNC-hint value stored in the SNC-hint data structure(s) 223. For example, the SNC-hint may indicate a preferred SNC memory allocation policy for the memory space. In some embodiments, the memory 221 may comprise one or more register(s) 229 to store the SNC-hint data structure(s) 223. Alternatively, or additionally, the processor core(s) 225 may determine the SNC-hint based on an instruction that triggered the request to initialize data (e.g., a SNC-policy-hint instruction).

In some embodiments, the processor core(s) 225 may override a default memory allocation policy for the SNC(s) 227 with the preferred SNC memory allocation policy indicated by the SNC-hint. For example, if the SNC-hint indicates that the specified memory space is to be interleaved the processor core(s) 225 allocates the specified memory space to be interleaved among all of the SNCs 227 (e.g., even the default/current memory allocation policy indicates otherwise). In some embodiments, the SNC-hint may indicate that the specified memory space to be interleaved among all of the SNCs 227 at a page granularity or a block granularity. In another example, if the SNC-hint indicates that the specified memory space is to be placed in a single node of the SNC(s) 227, the processor core(s) 225 allocates the specified memory space to the first node of the SNCs 227 that touches the data (e.g., even the default/current memory allocation policy indicates otherwise).

Embodiments of a processor core 225 may be integrated with any useful processor or controller. Non-limiting examples of suitable processors include the core 990 (FIG. 8B), the cores 1102A-N (FIGS. 10, 14), the processor 1210 (FIG. 11), the co-processor 1245 (FIG. 11), the processor 1370 (FIGS. 12-14), the processor/coprocessor 1380 (FIGS. 12-14), the coprocessor 1338 (FIG. 12), the processor 1315 (FIG. 12), the coprocessor 1520 (FIG. 14), and/or the processors 1614, 1616 (FIG. 15). Non-limiting examples of suitable controllers include the integrated memory controller unit(s) 1114 (FIG. 10), the GMCH 1290 (FIG. 11), the IMCs 1372 and 1382 (FIG. 12), the chipset 1390 (FIGS. 12 and 13), the control logic 1472 and 1482 (FIG. 13), and the interconnect unit(s) 1502 (FIG. 14).

For improved placement of shared data in sub-NUMA clustering systems, some embodiments provide one or more specific instructions for variable initialization that indicate a SNC policy to be applied to the memory space allocated for the variable (e.g., sometimes collectively referred to herein as SNC-policy-hint instructions). Representative embodiments of specific SNC-policy-hint instructions include a MOVSNCSHARE instruction, a VMOVSNCSHARE instruction, and a TMOVSNCSHARE (e.g., for scalar, advanced vector extensions (AVX), and advanced matrix extensions (AMX), respectively). The instructions may be executed as a store operation that carries a hint to the hardware to interleave a specific memory space across all the clusters, at either page or block granularity. Advantageously, some embodiments enable a programmer to manage globally shared data. The programmer may ensure that data shared by all clusters will be more evenly distributed among all the SNC caches and memory devices, while still allowing data that is private to each cluster to remain local to that cluster (e.g., via a default first-touch policy), thereby potentially improving application performance.

Figure 3:
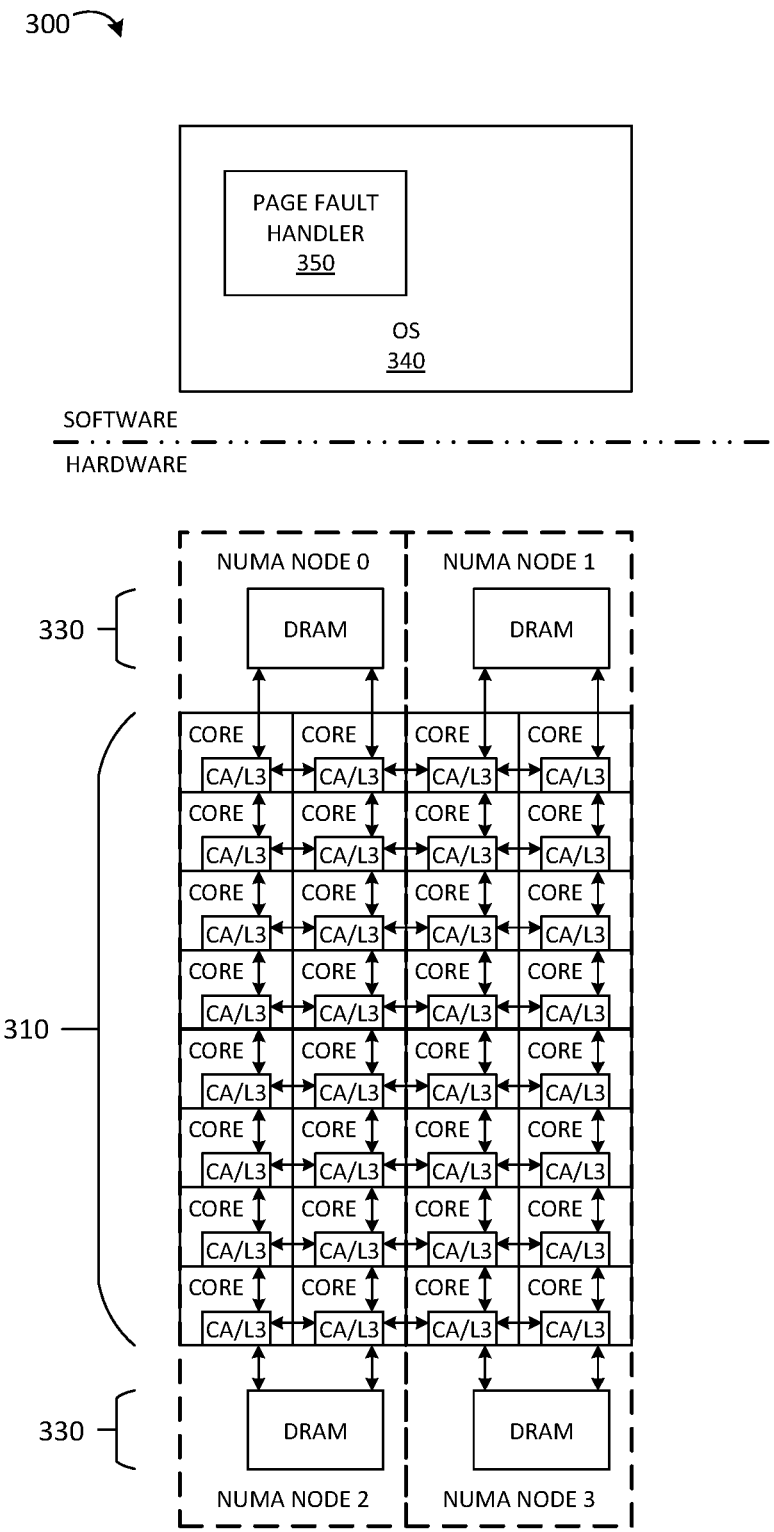
FIG. 3 is a block diagram of an example of a server according to an embodiment.

With reference to FIG. 3, an embodiment of a server 300 includes a processor 310 that supports SNC. As shown in FIG. 3, multiple cores each include a caching agent (CA) and L3 cache as a last-level cache (LLC) for system memory 330 (e.g., DRAM) logically partitioned into four clusters (e.g., organized in SNC-4 mode with NUMA node 0 through NUMA node 3). The user can pin each software thread to a specific cluster, and if data is managed data appropriately, LLC and DRAM access latencies and/or on-die interconnect traffic may be reduced.

In SNC mode, by default, data shared across clusters is placed in the NUMA node (e.g., also referred to as the cluster) that first touches the data. This may be referred to as a first-touch memory allocation policy. The following is an example of parallel pseudo-code in which array A is shared among all the threads and each thread needs to access all of A during its computation:

```
Main()
{
  int *C = new int [N];
  int *A = new int [A];
  std::memset(A, 10, sizeof(int) * N);
  #pragma omp parallel
  {
    int threadnum = omp_get_thread_num();
    int numthreads = omp_get_num_threads();
    int low = N*threadnum/numthreads;
    int high = N*(threadnum+1)/numthreads;
    std::memset(C, 0, sizeof(int) * N/numthreads);
    for (int i=low; i<high; i++) // do something with i
      for (int j=0; j<N; j++)
        C[i] =+ A[j];
  }
}
```

In the foregoing example, array A is allocated and initialized outside the parallel section by the primary/main thread with a conventional memset instruction. With the conventional instruction, array A will be placed in the primary thread's cluster (e.g., that cluster's memory channels and L3 cache). This data placement may cause two inefficiencies: 1) the data will not utilize the chip's full L3 cache capacity, which results in a higher L3 miss rate than if data was evenly spread across all clusters; and 2) all requests to array A will go to just one quarter (¼) of the chip's L3 slices and/or memory controllers, creating significant on-die interconnect congestion. The on-die interconnect congestion may increase access latency and reduce the effective bandwidth that each core can get from the L3 cache and system memory.

Some embodiments may provide specific SNC-policy-hint instructions as follows:
MOVSNCSHARE(mem, reg)
VMOVSNCSHARE(m512, zmm1)
VMOVSNCSHARE(m256, ymm1)
VMOVSNCSHARE(m128, xmm1)
TMOVSNCSHARE(sibmem, tmm1)

The foregoing instructions may be used for variable initialization. For example, the instructions may be executed to write data from the source operand (e.g., reg, zmm1, ymm1, xmm1, tmm1) to the address(es) specified in the destination operand (e.g., mem, m512, m256, m128, sibmem), and to guide the physical pages/blocks to be allocated in an interleaved fashion among all clusters (e.g., the instruction itself intrinsically provides the SNC-hint for an interleaved memory allocation policy). The following is an example of parallel pseudo-code that uses a possible intrinsic for VMOVSNCSHARE for data initialization:

```
Main()
{
  int *C = new int [N];
  int *A = new int [A];
  _m512i tmp= mm512_set_ps(10,10,10,10);
  for ( int i=0;i+16<N; i++)
    _mm_movSNCshare_ps(tmp, (_m512i*)A);
  #pragma omp parallel
  {
    int threadnum = omp_get_thread_num();
    int numthreads = omp_get_num_threads();
    int low = N*threadnum/numthreads;
    int high = N*(threadnum+1)/numthreads;
    std::memset(C, 0, sizeof(int) * N/numthreads);
    for (int i=low; i<high; i++) // do something with i
      for (int j=0; j<N; j++)
        C[i] =+ A[j];
  }
}
```

In the foregoing embodiment, instead of the conventional memset instruction, the, array A is allocated and initialized with the MOVSNCSHARE instruction, that provides a hint to the hardware to interleave the memory space for the array A, even if the default memory allocation policy is a first-touch memory allocation policy. Some embodiments may utilize page interleaving and/or block interleaving.

Page Interleaving Examples

For the page interleaving approach, some embodiments allocate physical pages interleaved across all the clusters, which may require or benefit from interaction with the operating system (OS). For example, an OS 340 may utilize a variety of memory allocation policies including a local node policy (e.g., "NODE LOCAL" in LINUX) and an interleave policy (e.g., "INTERLEAVE" in LINUX). Under the local node policy, the OS 340 allocates pages from the memory node local to the executing core. Under the interleave policy, the OS 340 allocates pages from all memory nodes in a round robin manner. For example, a conventional LINUX system uses INTERLEAVE as the default memory policy for LINUX kernel allocation on boot-up. However, the NODE LOCAL policy is the default memory allocation policy when the system is running in SNC mode.

For an embodiment of a LINUX system running in SNC mode, for data touched with a SNC-policy-hint instruction (e.g., the MOVSNCSHARE, VMOVSNCSHARE, or TMOVSNCSHARE instructions), the NODE LOCAL policy is overridden and the use of the INTERLEAVE policy is triggered. When an application executes the MOVSNCSHARE instruction, if a physical page in the corresponding page table entry has not been allocated yet, the kernel will step in and find an unused physical page. Instead of only finding unused physical page that map to the core's local cluster as implemented in the NODE LOCAL policy, in this embodiment the OS 340 instead uses the INTERLEAVE memory policy, which allocates pages on NUMA nodes in round robin manner (e.g., node 0, node 1, node 2, node 3, node 0 . . . ). In some embodiments, an OS page fault handler 350 may be configured to check the instruction that triggered the page fault, and if the instruction is a SNC-policy-hint instruction, the page fault handler 350 is configured to use the INTERLEAVE policy for memory allocation instead of the NODE LOCAL policy. In some embodiments (e.g., if checking the triggering instruction is considered problematic), the executed SNC-policy-hint instruction(s) may set a status bit (e.g., in a model specific register (MSR)) when delivering a page fault, to pass the hint to the OS 340.

In some embodiments, instead of or in addition to specific SNC-policy-hint instructions, a shared memory location or a shared register (e.g., such as a MSR) may be utilized to communicate the hint to use the interleave policy to the OS. For example, instead of a specific instruction to initialize data along with the hint, software could set the state of a specific MSR with an instruction to write the desired state to the MSR (e.g., a WRMSR instruction) to indicate to the OS 340 that the software was beginning initialization code. The software may then clear the state from the MSR when the initialization is done. In this embodiment, the OS fault handler 350 may be configured to check the MSR instead of the triggering instruction. If the corresponding MSR state is set, the OS 340 will allocate a page with the INTERLEAVE policy. Otherwise, the OS 340 will use the NODE LOCAL policy for page allocation.

Block Interleaving Examples

Embodiments of inter-cluster shared data management in SNC with page interleaving may interleave data in clusters at a fairly coarse granularity. Applications that are bandwidth constrained may benefit from embodiments of inter-cluster shared data management in SNC with block interleaving. Embodiments of block interleaving technology may allow data to be placed in an interleaved fashion across all clusters at a finer granularity (e.g., at a cache line granularity), and may be independent of the page interleaving embodiments.

In LINUX, for example, memory is managed in zones which represent ranges of memory space. In SNC mode, each NUMA node can be associated with one or multiple zones. In some embodiments, the OS is configured to allocate a zone specifically for inter-cluster shared data. When a SNC-policy-hint instruction triggers a page fault, and the OS goes to map the page, the OS is being given a hint to map the page into the inter-cluster shared data zone. Some embodiments add an additional hardware SNC range register for recording the address range of the inter-cluster shared zone.

In accordance with an embodiment of a system in SNC mode, hardware compares the physical address with the inter-cluster shared data address range in the SNC range register and, if the address is in that range, hardware will use a global hashing function (e.g., similar to the global hashing function utilized when not in SNC mode) to determine where to map the data. The global hashing function interleaves the data among SNCs at a cache block granularity. Advantageously, embodiments of block interleaving in accordance with a desired SNC memory allocation policy (e.g., indicated by the provided hint) allows shared data structures to be evenly distributed across L3 tiles, potentially reducing L3 cache and/or memory access latency and on-die interconnect traffic congestion compared to a default memory allocation policy.

OS Support Examples

In accordance with some embodiments, support for the SNC-hint capability may be enumerated through the addition of dedicated capability bits. For example, the dedicated capability bits may be enumerated by hardware through additional capability bits in a CPUID instruction. In some embodiments, the SNC-hint capability may be available only in certain processor modes (e.g. in 64-bit operation).

In some embodiments, a SNC-hint feature may be enabled by system software using specific enabling bits in general or dedicated registers (e.g., in CR4 or in an architectural model-specific register (MSR)). Optionally, the availability of the instruction support for the SNC-hint may be conditioned on software having enabled the feature. For example, the instructions for using the SNC-hint may trigger a fault when the SNC-hint is not enabled.

In some embodiments, hardware may provide an extension to allow fast save/restore of the state associated with the SNC-hint. For example, hardware may provide an extension to the XSAVE/XSTORE architecture for a new state component associated with SNC-hint, and/or specific instructions to save/restore a list of registers (e.g., including those registers associated with SNC-hint).

In accordance with some embodiments, operating systems may manage the SNC-hint in any of a variety of ways. For example, the OS may choose to enable only one mode or provide an API to allow applications to select the mode it needs. Two example state management policies include a global SNC-hint mode and a virtual SNC-hint mode.

Figure 4:
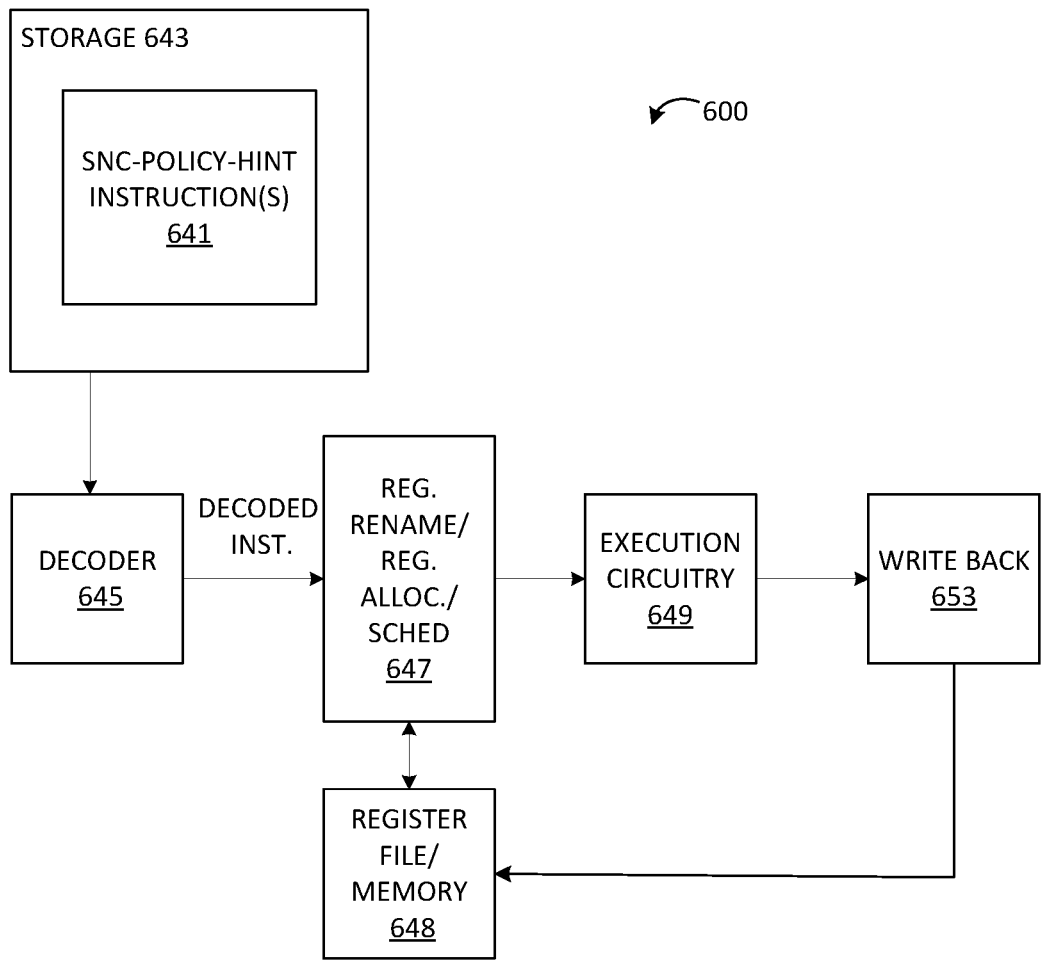
FIG. 4 is a block diagram of an example of hardware according to an embodiment.

FIG. 4 illustrates an embodiment of hardware 600 to process instructions such as SNC-policy-hint instructions (e.g., MOVSNCSHARE, VMOVSNCSHARE, TMOVSNCSHARE, etc.). As illustrated, storage 643 stores one or more SNC-policy-hint instructions 641 to be executed. Decode circuitry 645 may be configured to decode a single instruction, the single instruction to include a field for an opcode, and execution circuitry 649 to execute the decoded instruction according to the opcode.

One of the SNC-policy-hint instructions 641 is received by decode circuitry 645. For example, the decode circuitry 645 receives this instruction from fetch logic/circuitry. The instruction includes fields for an opcode, a source, and a destination. In some embodiments, the source and destination are registers, and in other embodiments one or more are memory locations. In some embodiments, the opcode details which SNC store operation is to be performed and what the preferred SNC memory allocation policy is for that SNC store operation.

The decode circuitry 645 decodes the instruction into one or more operations. In some embodiments, this decoding includes generating a plurality of micro-operations to be performed by execution circuitry (such as execution circuitry 649). The decode circuitry 645 also decodes instruction prefixes.

In some embodiments, register renaming, register allocation, and/or scheduling circuitry 647 provides functionality for one or more of: 1) renaming logical operand values to physical operand values (e.g., a register alias table in some embodiments), 2) allocating status bits and flags to the decoded instruction, and 3) scheduling the decoded instruction for execution on execution circuitry out of an instruction pool (e.g., using a reservation station in some embodiments).

Registers (register file) and/or memory 648 store data as operands of the instruction to be operated on by execution circuitry 649. Exemplary register types include packed data registers, general purpose registers, and floating point registers.

Execution circuitry 649 executes the decoded instruction. Exemplary detailed execution circuitry is shown in FIG. 8B, etc. The execution of the decoded instruction causes the execution circuitry 649 to execute the decoded instruction according to the opcode. For some SNC-policy-hint instructions, for example, the execution of the decoded instruction causes the execution circuitry 649 to provide an indicated SNC memory allocation policy (e.g., a SNC-hint) to hardware and/or software that supports the SNC(s). In some embodiments, the opcode intrinsically specifies the indicated SNC memory allocation policy. Alternatively, or additionally, the execution circuitry 649 may be further caused to execute the decoded instruction according to the SNC-policy-hint instruction opcode to store information in a register (e.g., a MSR) that corresponds to the indicated SNC memory allocation policy.

In some embodiments, the single instruction further includes a field for an identifier of a source operand and a field for an identifier of a destination operand, and the execution circuitry 649 is further to execute the decoded instruction according to the opcode to retrieve source information from a location indicated by the source operand, and store the source information to a location indicated by the destination operand in accordance with the indicated SNC memory allocation policy. For example, the execution circuitry 649 may be further to execute the decoded instruction according to the opcode to allocate a memory space specified by the destination operand in two or more SNCs in accordance with the indicated SNC memory allocation policy. In some embodiments, the execution circuitry 649 is further to execute the decoded instruction according to the opcode to override a default memory allocation policy for the specified memory space of the two or more SNCs with the indicated SNC memory allocation policy.

In some embodiments, the execution circuitry 649 may be further to execute the decoded instruction according to the opcode to determine if the indicated SNC memory allocation policy indicates that the specified memory space is to be interleaved; and, if so determined, to allocate the specified memory space to be interleaved among all of the two or more SNCs. For example, the execution circuitry 649 may be further to execute the decoded instruction according to the opcode to allocate the specified memory space to be interleaved among all of the two or more SNCs at a page granularity. Alternatively, or additionally, the execution circuitry 649 may be further to execute the decoded instruction according to the opcode to allocate the specified memory space to be interleaved among all of the two or more SNCs at a block granularity.

In some embodiments, retirement/write back circuitry 653 architecturally commits the destination register into the registers or memory 648 and retires the instruction.

Figure 5:
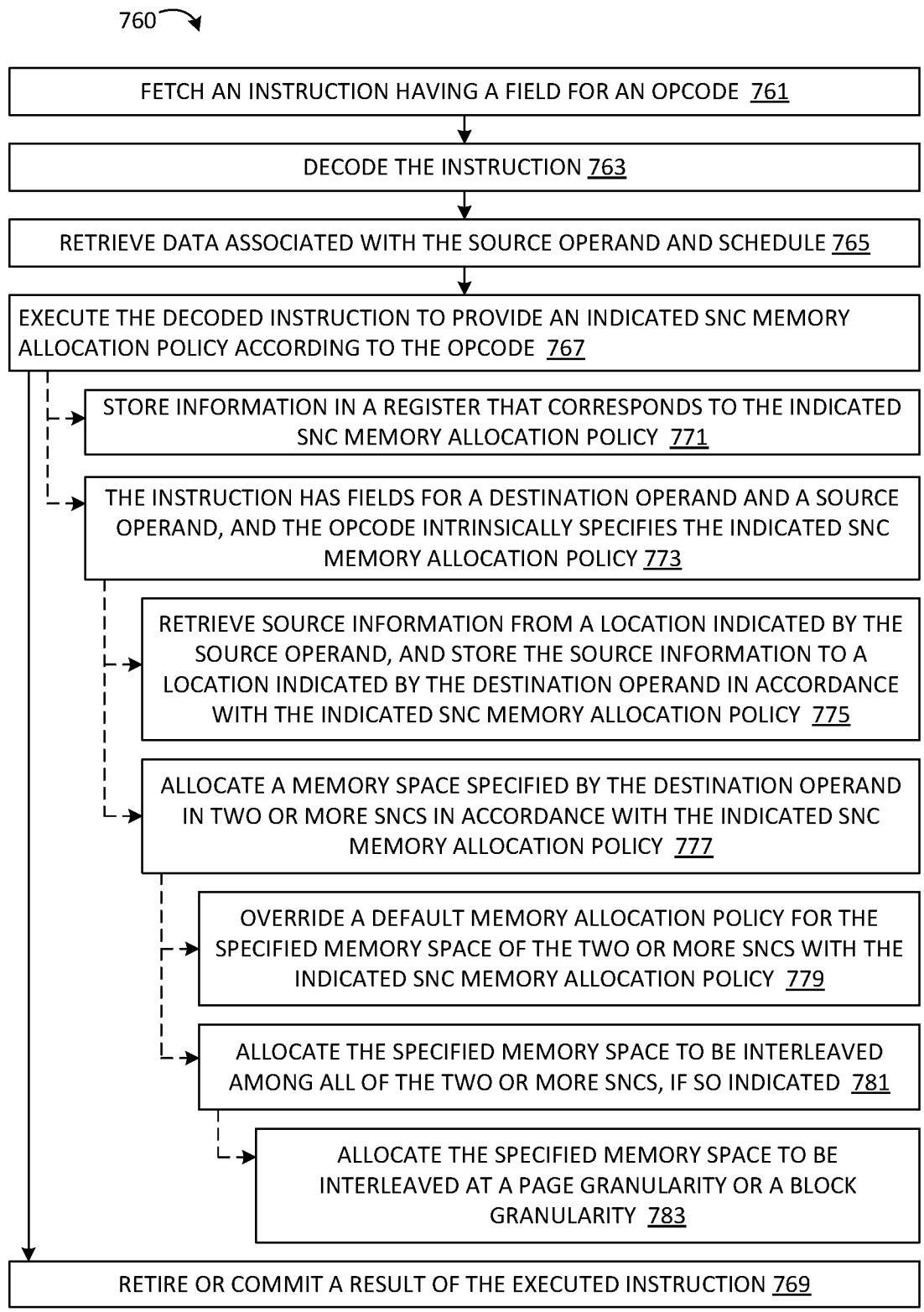
FIG. 5 is a flow diagram of an example of a method according to an embodiment.

FIG. 5 illustrates an embodiment of method 760 performed by a processor to process SNC-policy-hint instructions. For example, a processor core as shown in FIG. 8B, a pipeline as detailed below, etc. performs this method.

At 761, an instruction is fetched. For example, a SNC-policy-hint instruction is fetched. The SNC-policy-hint instruction includes fields for one or more of an opcode, a destination operand, and a source operand. In some embodiments, the instruction is fetched from an instruction cache. The source operands and destination operand are packed data. The opcode of the SNC-policy-hint instruction indicates a preferred SNC memory allocation policy. The SNC-policy-hint instruction may further indicate which store operation to perform.

The fetched instruction is decoded at 763. For example, the fetched SNC-policy-hint instruction is decoded by decode circuitry such as that detailed herein.

Data values associated with the source operands of the decoded instruction are retrieved and execution of the decoded instruction is scheduled at 765. For example, when one or more of the source operands are memory operands, the data from the indicated memory location is retrieved.

At 767, the decoded instruction is executed by execution circuitry (hardware) such as that detailed herein. For a SNC-policy-hint instruction, the execution will cause the execution circuitry to provide an indicated SNC memory allocation policy according to the opcode (e.g., a SNC-hint for hardware and/or software that supports the SNC(s)).

In some embodiments, the instruction is committed or retired at 769.

In some embodiments, the execution of the decoded SNC-policy-hint instruction will cause execution circuitry to store information in a register that corresponds to the indicated SNC memory allocation policy at 771. In some embodiments, the instruction has fields for a destination operand and a source operand, and the opcode intrinsically specifies the indicated SNC memory allocation policy at 773. For example, the execution of the decoded SNC-policy-hint instruction may cause execution circuitry to retrieve source information from a location indicated by the source operand, and store the source information to a location indicated by the destination operand in accordance with the indicated SNC memory allocation policy at 775.

In some embodiments, the execution of the decoded SNC-policy-hint instruction may cause execution circuitry to allocate a memory space specified by the destination operand in two or more SNCs in accordance with the indicated SNC memory allocation policy at 777. For example, the execution of the decoded SNC-policy-hint instruction may cause execution circuitry to override a default memory allocation policy for the specified memory space of the two or more SNCs with the indicated SNC memory allocation policy at 779. In some embodiments, the execution of the decoded SNC-policy-hint instruction may cause execution circuitry to determine if the indicated SNC memory allocation policy indicates that the specified memory space is to be interleaved and, if so determined, allocate the specified memory space to be interleaved among all of the two or more SNCs at 781. For example, the execution of the decoded SNC-policy-hint instruction may cause execution circuitry to allocate the specified memory space to be interleaved among all of the two or more SNCs at a page granularity or a block granularity at 783.

Figure 6:
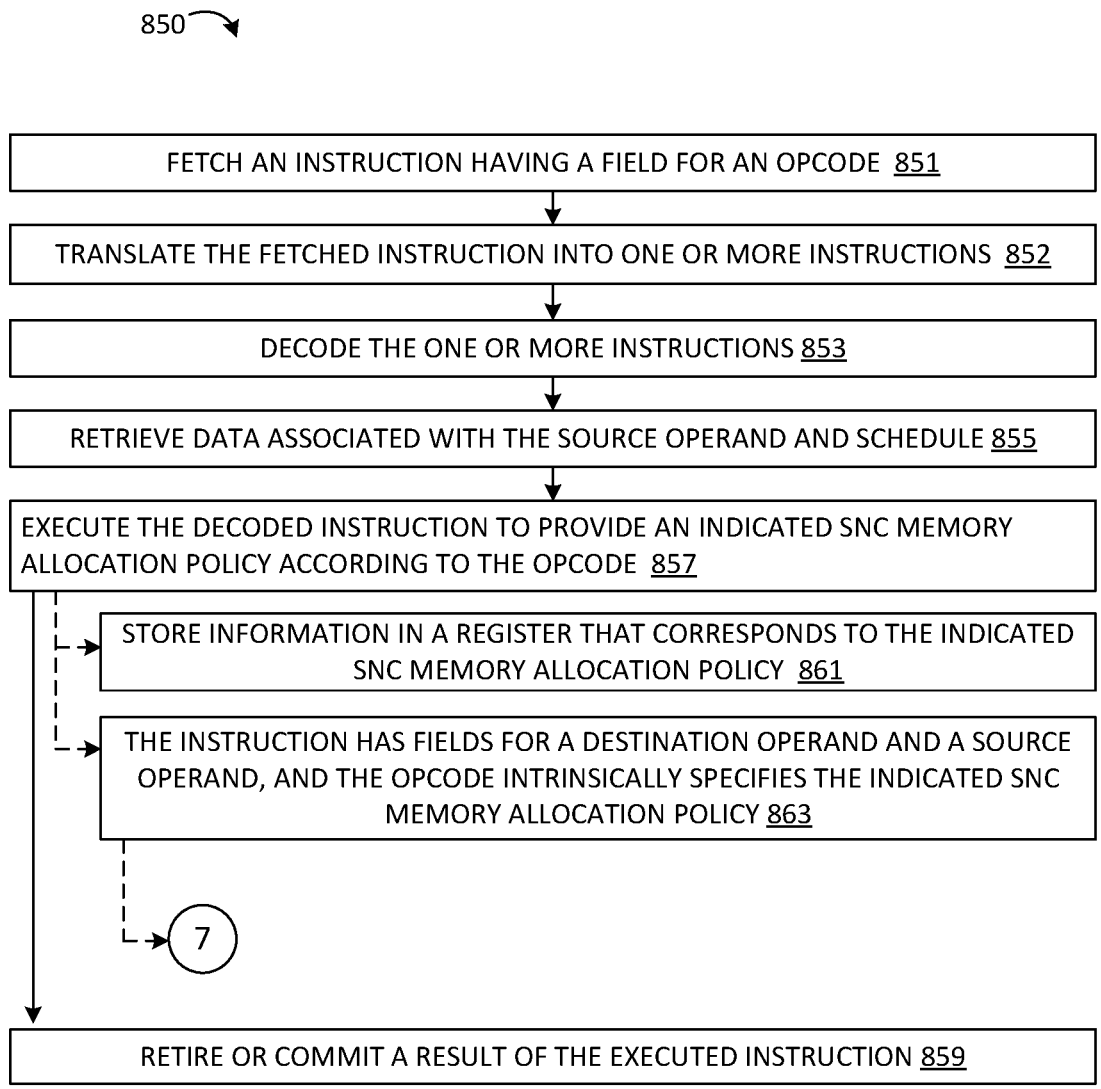
FIGS. 6 to 7 are flow diagrams of another example of a method according to an embodiment.
Figure 7:
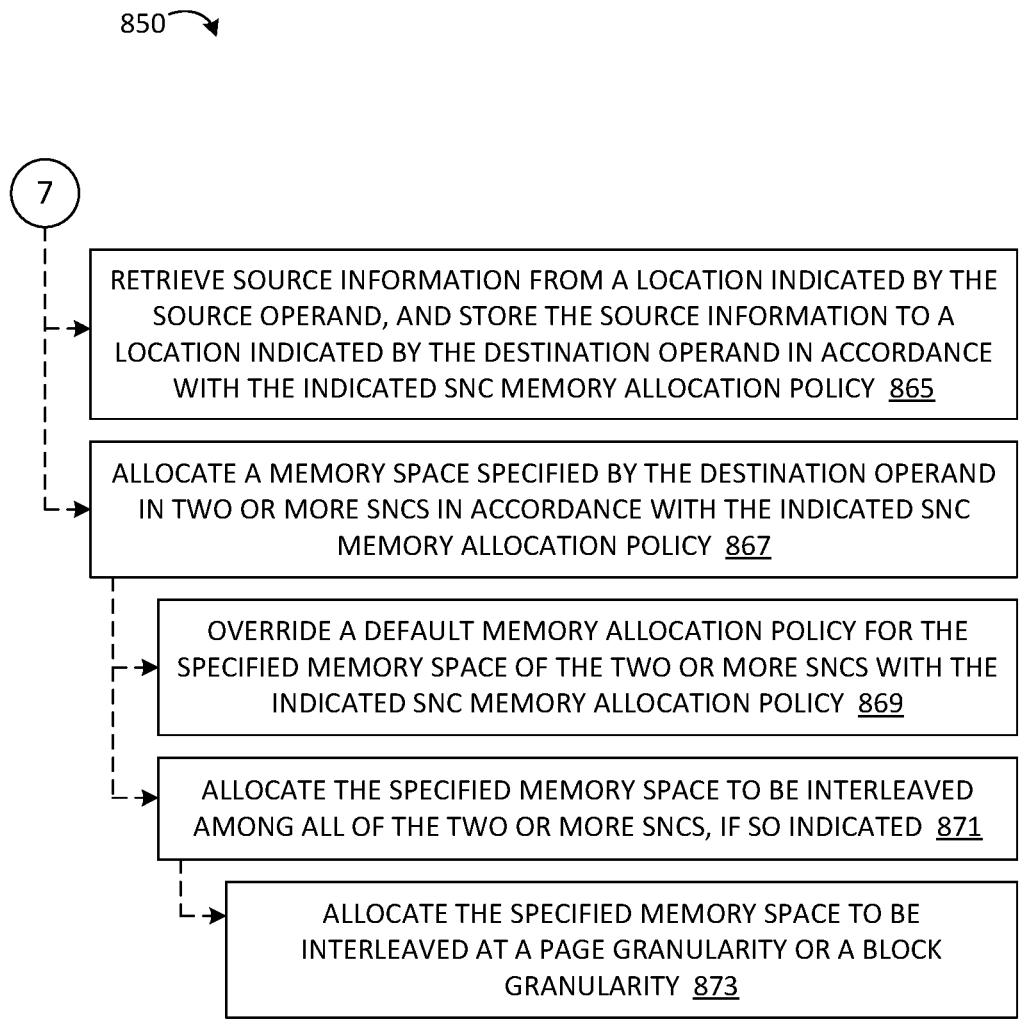

FIGS. 6 to 7 illustrate an embodiment of method 850 performed by a processor to process a SNC-policy-hint instruction using emulation or binary translation. For example, a processor core as shown in FIG. 8B, a pipeline as detailed below, etc. performs this method.

At 851, an instruction is fetched. For example, a SNC-policy-hint instruction is fetched. The SNC-policy-hint instruction includes fields for one or more of an opcode, a destination operand, and a source operand. In some embodiments, the instruction is fetched from an instruction cache. The source operands and destination operand are packed data. The opcode of the SNC-policy-hint instruction may indicate a preferred SNC memory allocation policy. The SNC-policy-hint instruction may further indicate which store operation to perform.

The fetched instruction of a first instruction set is translated into one or more instructions of a second instruction set at 852.

The one or more translated instructions of the second instruction set are decoded at 853. In some embodiments, the translation and decoding are merged. For example, the a SNC-policy-hint instruction is decoded by decode circuitry such as that detailed herein.

Data values associated with the source operands of the decoded instruction are retrieved and execution of the decoded instruction is scheduled at 855. For example, when one or more of the source operands are memory operands, the data from the indicated memory location is retrieved.

At 857, the decoded instruction is executed by execution circuitry (hardware) such as that detailed herein. For a SNC-policy-hint instruction, the execution will cause the execution circuitry to provide an indicated SNC memory allocation policy according to the opcode (e.g., a SNC-hint for hardware and/or software that supports the SNC(s)).

In some embodiments, the instruction is committed or retired at 859.

In some embodiments, the execution of the decoded SNC-policy-hint instruction will cause execution circuitry to store information in a register that corresponds to the indicated SNC memory allocation policy at 861. In some embodiments, the instruction has fields for a destination operand and a source operand, and the opcode intrinsically specifies the indicated SNC memory allocation policy at 863. For example, the execution of the decoded SNC-policy-hint instruction may cause execution circuitry to retrieve source information from a location indicated by the source operand, and store the source information to a location indicated by the destination operand in accordance with the indicated SNC memory allocation policy at 865.

In some embodiments, the execution of the decoded SNC-policy-hint instruction may cause execution circuitry to allocate a memory space specified by the destination operand in two or more SNCs in accordance with the indicated SNC memory allocation policy at 867. For example, the execution of the decoded SNC-policy-hint instruction may cause execution circuitry to override a default memory allocation policy for the specified memory space of the two or more SNCs with the indicated SNC memory allocation policy at 869. In some embodiments, the execution of the decoded SNC-policy-hint instruction may cause execution circuitry to determine if the indicated SNC memory allocation policy indicates that the specified memory space is to be interleaved and, if so determined, allocate the specified memory space to be interleaved among all of the two or more SNCs at 871. For example, the execution of the decoded SNC-policy-hint instruction may cause execution circuitry to allocate the specified memory space to be interleaved among all of the two or more SNCs at a page granularity or a block granularity at 873.

Those skilled in the art will appreciate that a wide variety of devices may benefit from the foregoing embodiments. The following exemplary core architectures, processors, and computer architectures are non-limiting examples of devices that may beneficially incorporate embodiments of the technology described herein.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-Order and Out-of-Order Core Block Diagram

FIG. 8A is a block diagram illustrating both an exemplary in-order pipeline and an exemplary register renaming, out-of-order issue/execution pipeline according to embodiments of the invention. FIG. 8B is a block diagram illustrating both an exemplary embodiment of an in-order architecture core and an exemplary register renaming, out-of-order issue/execution architecture core to be included in a processor according to embodiments of the invention. The solid lined boxes in FIGS. 8A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 8A, a processor pipeline 900 includes a fetch stage 902, a length decode stage 904, a decode stage 906, an allocation stage 908, a renaming stage 910, a scheduling (also known as a dispatch or issue) stage 912, a register read/memory read stage 914, an execute stage 916, a write back/memory write stage 918, an exception handling stage 922, and a commit stage 924.

FIG. 8B shows processor core 990 including a front end unit 930 coupled to an execution engine unit 950, and both are coupled to a memory unit 970. The core 990 may be a reduced instruction set computing (RISC) core, a complex instruction set computing (CISC) core, a very long instruction word (VLIW) core, or a hybrid or alternative core type. As yet another option, the core 990 may be a special-purpose core, such as, for example, a network or communication core, compression engine, coprocessor core, general purpose computing graphics processing unit (GPGPU) core, graphics core, or the like.

The front end unit 930 includes a branch prediction unit 932 coupled to an instruction cache unit 934, which is coupled to an instruction translation lookaside buffer (TLB) 936, which is coupled to an instruction fetch unit 938, which is coupled to a decode unit 940. The decode unit 940 (or decoder) may decode instructions, and generate as an output one or more micro-operations, micro-code entry points, microinstructions, other instructions, or other control signals, which are decoded from, or which otherwise reflect, or are derived from, the original instructions. The decode unit 940 may be implemented using various different mechanisms. Examples of suitable mechanisms include, but are not limited to, look-up tables, hardware implementations, programmable logic arrays (PLAs), microcode read only memories (ROMs), etc. In one embodiment, the core 990 includes a microcode ROM or other medium that stores microcode for certain macroinstructions (e.g., in decode unit 940 or otherwise within the front end unit 930). The decode unit 940 is coupled to a rename/allocator unit 952 in the execution engine unit 950.

The execution engine unit 950 includes the rename/allocator unit 952 coupled to a retirement unit 954 and a set of one or more scheduler unit(s) 956. The scheduler unit(s) 956 represents any number of different schedulers, including reservations stations, central instruction window, etc. The scheduler unit(s) 956 is coupled to the physical register file(s) unit(s) 958. Each of the physical register file(s) units 958 represents one or more physical register files, different ones of which store one or more different data types, such as scalar integer, scalar floating point, packed integer, packed floating point, vector integer, vector floating point, status (e.g., an instruction pointer that is the address of the next instruction to be executed), etc. In one embodiment, the physical register file(s) unit 958 comprises a vector registers unit, a write mask registers unit, and a scalar registers unit. These register units may provide architectural vector registers, vector mask registers, and general purpose registers. The physical register file(s) unit(s) 958 is overlapped by the retirement unit 954 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 954 and the physical register file(s) unit(s) 958 are coupled to the execution cluster(s) 960. The execution cluster(s) 960 includes a set of one or more execution units 962 and a set of one or more memory access units 964. The execution units 962 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 956, physical register file(s) unit(s) 958, and execution cluster(s) 960 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 964). It should also be understood that where separate pipelines are used, one or more of these pipelines may be out-of-order issue/execution and the rest in-order.

The set of memory access units 964 is coupled to the memory unit 970, which includes a data TLB unit 972 coupled to a data cache unit 974 coupled to a level 2 (L2) cache unit 976. In one exemplary embodiment, the memory access units 964 may include a load unit, a store address unit, and a store data unit, each of which is coupled to the data TLB unit 972 in the memory unit 970. The instruction cache unit 934 is further coupled to a level 2 (L2) cache unit 976 in the memory unit 970. The L2 cache unit 976 is coupled to one or more other levels of cache and eventually to a main memory.

By way of example, the exemplary register renaming, out-of-order issue/execution core architecture may implement the pipeline 900 as follows: 1) the instruction fetch 938 performs the fetch and length decoding stages 902 and 904; 2) the decode unit 940 performs the decode stage 906; 3) the rename/allocator unit 952 performs the allocation stage 908 and renaming stage 910; 4) the scheduler unit(s) 956 performs the schedule stage 912; 5) the physical register file(s) unit(s) 958 and the memory unit 970 perform the register read/memory read stage 914; the execution cluster 960 perform the execute stage 916; 6) the memory unit 970 and the physical register file(s) unit(s) 958 perform the write back/memory write stage 918; 7) various units may be involved in the exception handling stage 922; and 8) the retirement unit 954 and the physical register file(s) unit(s) 958 perform the commit stage 924.

The core 990 may support one or more instructions sets (e.g., the x86 instruction set (with some extensions that have been added with newer versions); the MIPS instruction set of MIPS Technologies of Sunnyvale, CA; the ARM instruction set (with optional additional extensions such as NEON) of ARM Holdings of Sunnyvale, CA), including the instruction(s) described herein. In one embodiment, the core 990 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 934/974 and a shared L2 cache unit 976, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 9A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 9A is a block diagram of a single processor core, along with its connection to the on-die interconnect network 1002 and with its local subset of the Level 2 (L2) cache 1004, according to embodiments of the invention. In one embodiment, an instruction decoder 1000 supports the x86 instruction set with a packed data instruction set extension. An L1 cache 1006 allows low-latency accesses to cache memory into the scalar and vector units. While in one embodiment (to simplify the design), a scalar unit 1008 and a vector unit 1010 use separate register sets (respectively, scalar registers 1012 and vector registers 1014) and data transferred between them is written to memory and then read back in from a level 1 (L1) cache 1006, alternative embodiments of the invention may use a different approach (e.g., use a single register set or include a communication path that allow data to be transferred between the two register files without being written and read back).

The local subset of the L2 cache 1004 is part of a global L2 cache that is divided into separate local subsets, one per processor core. Each processor core has a direct access path to its own local subset of the L2 cache 1004. Data read by a processor core is stored in its L2 cache subset 1004 and can be accessed quickly, in parallel with other processor cores accessing their own local L2 cache subsets. Data written by a processor core is stored in its own L2 cache subset 1004 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 9B is an expanded view of part of the processor core in FIG. 9A according to embodiments of the invention. FIG. 9B includes an L1 data cache 1006A part of the L1 cache 1006, as well as more detail regarding the vector unit 1010 and the vector registers 1014. Specifically, the vector unit 1010 is a 16-wide vector processing unit (VPU) (see the 16-wide ALU 1028), which executes one or more of integer, single-precision float, and double-precision float instructions. The VPU supports swizzling the register inputs with swizzle unit 1020, numeric conversion with numeric convert units 1022A-B, and replication with replication unit 1024 on the memory input. Write mask registers 1026 allow predicating resulting vector writes.

Figure 10:
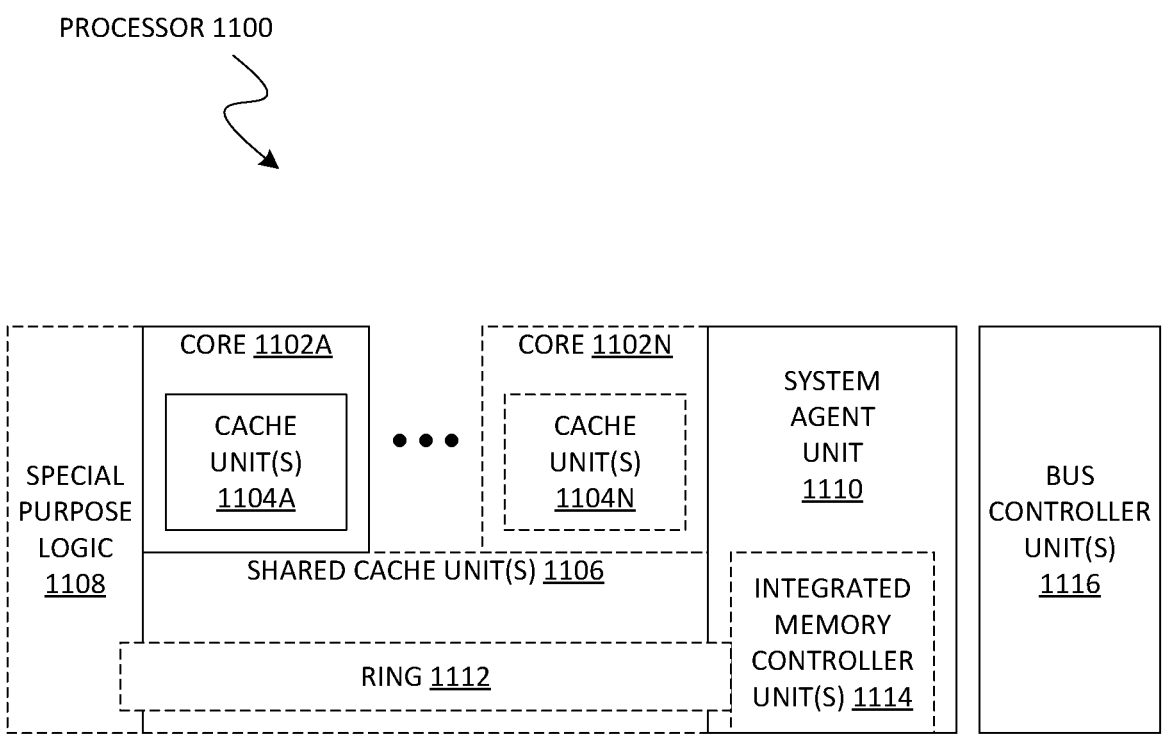
FIG. 10 is a block diagram of a processor that may have more than one core, may have an integrated memory controller, and may have integrated graphics according to embodiments of the invention.

FIG. 10 is a block diagram of a processor 1100 that may have more than one core, may have an integrated memory controller, and may have integrated graphics according to embodiments of the invention. The solid lined boxes in FIG. 10 illustrate a processor 1100 with a single core 1102A, a system agent 1110, a set of one or more bus controller units 1116, while the optional addition of the dashed lined boxes illustrates an alternative processor 1100 with multiple cores 1102A-N, a set of one or more integrated memory controller unit(s) 1114 in the system agent unit 1110, and special purpose logic 1108.

Thus, different implementations of the processor 1100 may include: 1) a CPU with the special purpose logic 1108 being integrated graphics and/or scientific (throughput) logic (which may include one or more cores), and the cores 1102A-N being one or more general purpose cores (e.g., general purpose in-order cores, general purpose out-of-order cores, a combination of the two); 2) a coprocessor with the cores 1102A-N being a large number of special purpose cores intended primarily for graphics and/or scientific (throughput); and 3) a coprocessor with the cores 1102A-N being a large number of general purpose in-order cores. Thus, the processor 1100 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1100 may be a part of and/or may be implemented on one or more substrates using any of a number of process technologies, such as, for example, BiCMOS, CMOS, or NMOS.

The memory hierarchy includes one or more levels of respective caches 1104A-N within the cores 1102A-N, a set or one or more shared cache units 1106, and external memory (not shown) coupled to the set of integrated memory controller units 1114. The set of shared cache units 1106 may include one or more mid-level caches, such as level 2 (L2), level 3 (L3), level 4 (L4), or other levels of cache, a last level cache (LLC), and/or combinations thereof. While in one embodiment a ring based interconnect unit 1112 interconnects the integrated graphics logic 1108, the set of shared cache units 1106, and the system agent unit 1110/integrated memory controller unit(s) 1114, alternative embodiments may use any number of well-known techniques for interconnecting such units. In one embodiment, coherency is maintained between one or more cache units 1106 and cores 1102-A-N.

In some embodiments, one or more of the cores 1102A-N are capable of multithreading. The system agent 1110 includes those components coordinating and operating cores 1102A-N. The system agent unit 1110 may include for example a power control unit (PCU) and a display unit. The PCU may be or include logic and components needed for regulating the power state of the cores 1102A-N and the integrated graphics logic 1108. The display unit is for driving one or more externally connected displays.

The cores 1102A-N may be homogenous or heterogeneous in terms of architecture instruction set; that is, two or more of the cores 1102A-N may be capable of execution the same instruction set, while others may be capable of executing only a subset of that instruction set or a different instruction set.

Exemplary Computer Architectures

FIGS. 11-14 are block diagrams of exemplary computer architectures. Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 11:
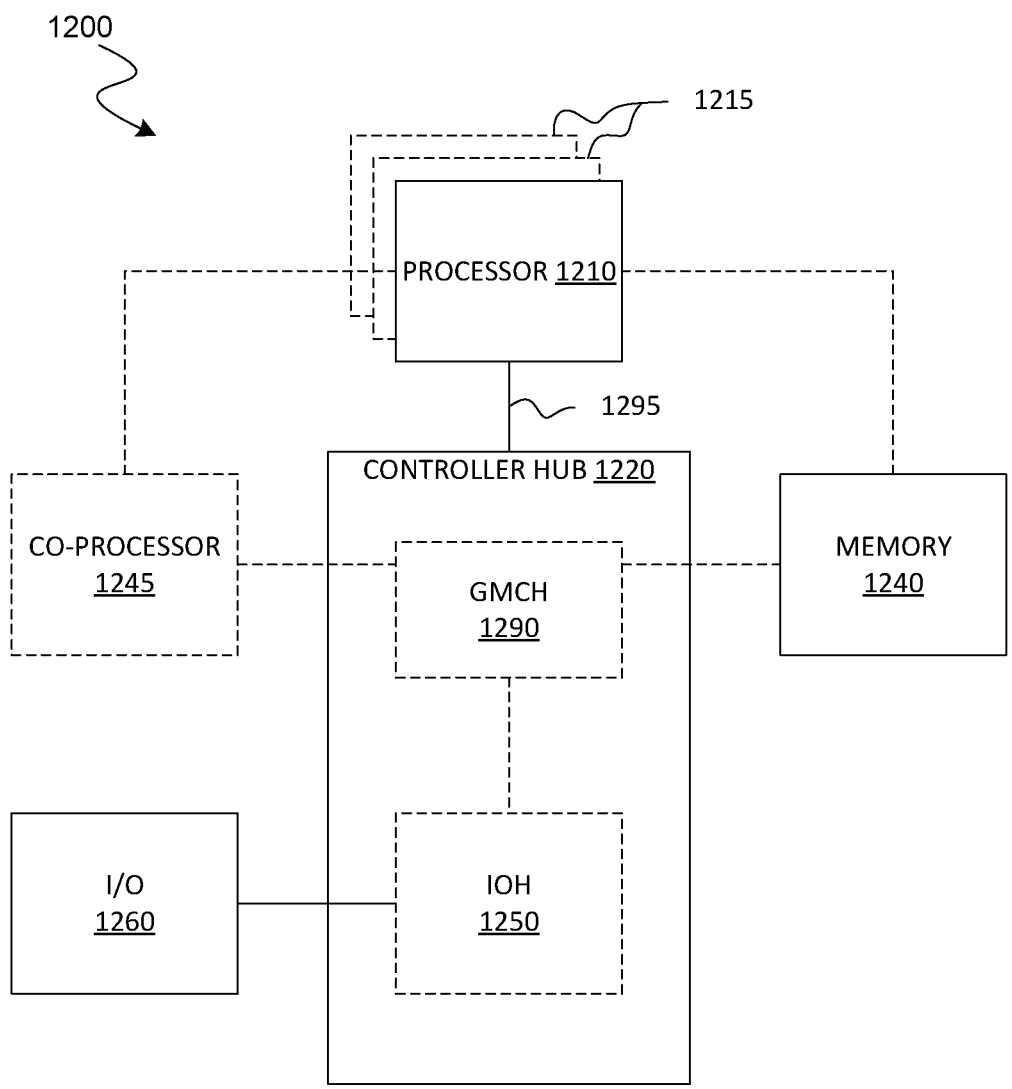
FIGS. 11-14 are block diagrams of exemplary computer architectures.

Referring now to FIG. 11, shown is a block diagram of a system 1200 in accordance with one embodiment of the present invention. The system 1200 may include one or more processors 1210, 1215, which are coupled to a controller hub 1220. In one embodiment the controller hub 1220 includes a graphics memory controller hub (GMCH) 1290 and an Input/Output Hub (IOH) 1250 (which may be on separate chips); the GMCH 1290 includes memory and graphics controllers to which are coupled memory 1240 and a coprocessor 1245; the IOH 1250 couples input/output (I/O) devices 1260 to the GMCH 1290. Alternatively, one or both of the memory and graphics controllers are integrated within the processor (as described herein), the memory 1240 and the coprocessor 1245 are coupled directly to the processor 1210, and the controller hub 1220 in a single chip with the IOH 1250.

The optional nature of additional processors 1215 is denoted in FIG. 11 with broken lines. Each processor 1210, 1215 may include one or more of the processing cores described herein and may be some version of the processor 1100.

The memory 1240 may be, for example, dynamic random access memory (DRAM), phase change memory (PCM), or a combination of the two. For at least one embodiment, the controller hub 1220 communicates with the processor(s) 1210, 1215 via a multi-drop bus, such as a frontside bus (FSB), point-to-point interface such as QuickPath Interconnect (QPI), or similar connection 1295.

In one embodiment, the coprocessor 1245 is a special-purpose processor, such as, for example, a high-throughput MIC processor, a network or communication processor, compression engine, graphics processor, GPGPU, embedded processor, or the like. In one embodiment, controller hub 1220 may include an integrated graphics accelerator.

There can be a variety of differences between the physical resources 1210, 1215 in terms of a spectrum of metrics of merit including architectural, microarchitectural, thermal, power consumption characteristics, and the like.

In one embodiment, the processor 1210 executes instructions that control data processing operations of a general type. Embedded within the instructions may be coprocessor instructions. The processor 1210 recognizes these coprocessor instructions as being of a type that should be executed by the attached coprocessor 1245. Accordingly, the processor 1210 issues these coprocessor instructions (or control signals representing coprocessor instructions) on a coprocessor bus or other interconnect, to coprocessor 1245. Coprocessor(s) 1245 accept and execute the received coprocessor instructions.

Figure 12:
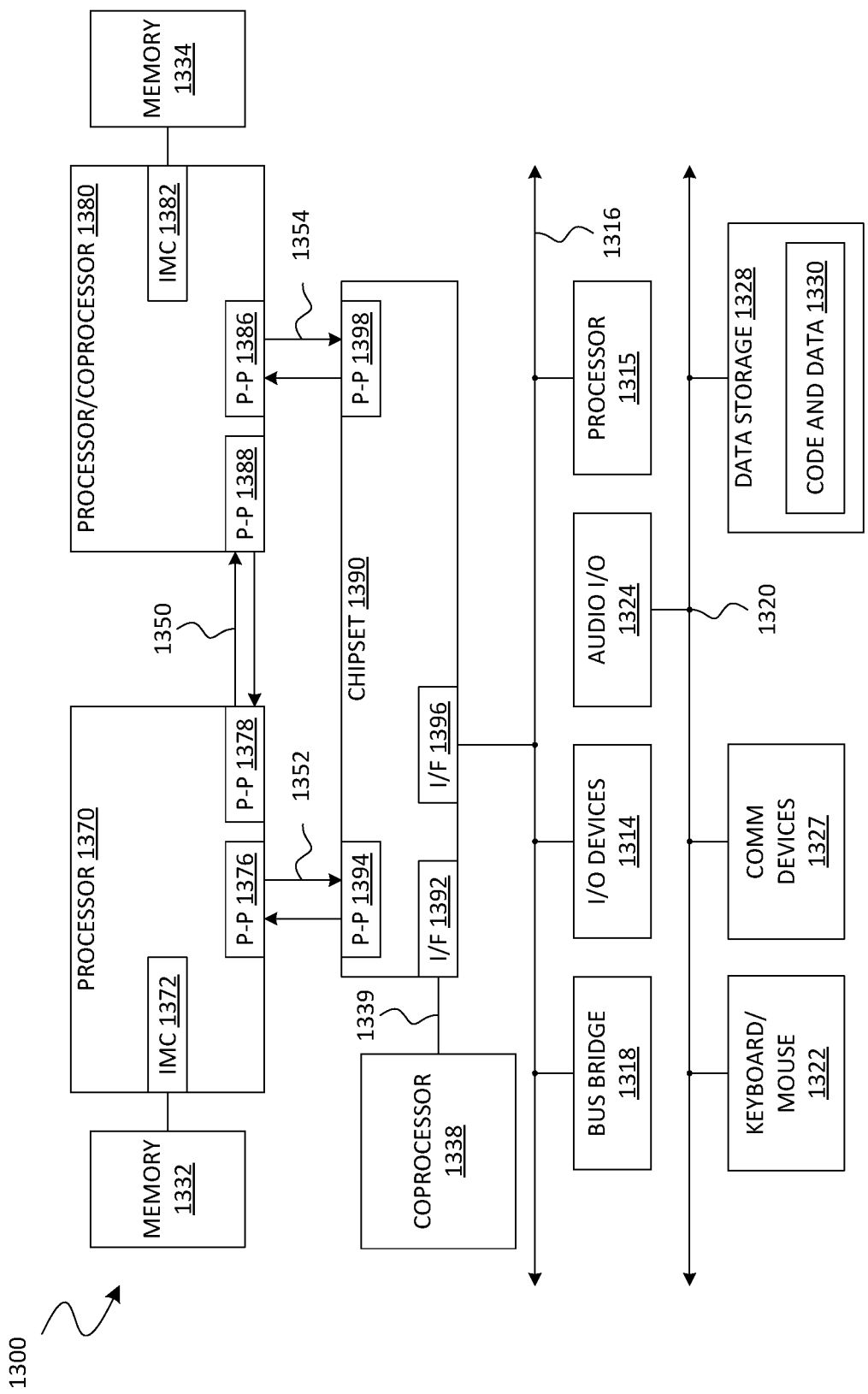

Referring now to FIG. 12, shown is a block diagram of a first more specific exemplary system 1300 in accordance with an embodiment of the present invention. As shown in FIG. 12, multiprocessor system 1300 is a point-to-point interconnect system, and includes a first processor 1370 and a second processor 1380 coupled via a point-to-point interconnect 1350. Each of processors 1370 and 1380 may be some version of the processor 1100. In one embodiment of the invention, processors 1370 and 1380 are respectively processors 1210 and 1215, while coprocessor 1338 is coprocessor 1245. In another embodiment, processors 1370 and 1380 are respectively processor 1210 coprocessor 1245.

Processors 1370 and 1380 are shown including integrated memory controller (IMC) units 1372 and 1382, respectively. Processor 1370 also includes as part of its bus controller units point-to-point (P-P) interfaces 1376 and 1378; similarly, second processor 1380 includes P-P interfaces 1386 and 1388. Processors 1370, 1380 may exchange information via a point-to-point (P-P) interface 1350 using P-P interface circuits 1378, 1388. As shown in FIG. 12, IMCs 1372 and 1382 couple the processors to respective memories, namely a memory 1332 and a memory 1334, which may be portions of main memory locally attached to the respective processors.

Processors 1370, 1380 may each exchange information with a chipset 1390 via individual P-P interfaces 1352, 1354 using point to point interface circuits 1376, 1394, 1386, 1398. Chipset 1390 may optionally exchange information with the coprocessor 1338 via a high-performance interface 1339 and an interface 1392. In one embodiment, the coprocessor 1338 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1390 may be coupled to a first bus 1316 via an interface 1396. In one embodiment, first bus 1316 may be a Peripheral Component Interconnect (PCI) bus, or a bus such as a PCI Express bus or another third generation I/O interconnect bus, although the scope of the present invention is not so limited.

As shown in FIG. 12, various I/O devices 1314 may be coupled to first bus 1316, along with a bus bridge 1318 which couples first bus 1316 to a second bus 1320. In one embodiment, one or more additional processor(s) 1315, such as coprocessors, high-throughput MIC processors, GPGPU's, accelerators (such as, e.g., graphics accelerators or digital signal processing (DSP) units), field programmable gate arrays, or any other processor, are coupled to first bus 1316. In one embodiment, second bus 1320 may be a low pin count (LPC) bus. Various devices may be coupled to a second bus 1320 including, for example, a keyboard and/or mouse 1322, communication devices 1327 and a storage unit 1328 such as a disk drive or other mass storage device which may include instructions/code and data 1330, in one embodiment. Further, an audio I/O 1324 may be coupled to the second bus 1320. Note that other architectures are possible. For example, instead of the point-to-point architecture of FIG. 12, a system may implement a multi-drop bus or other such architecture.

Figure 13:
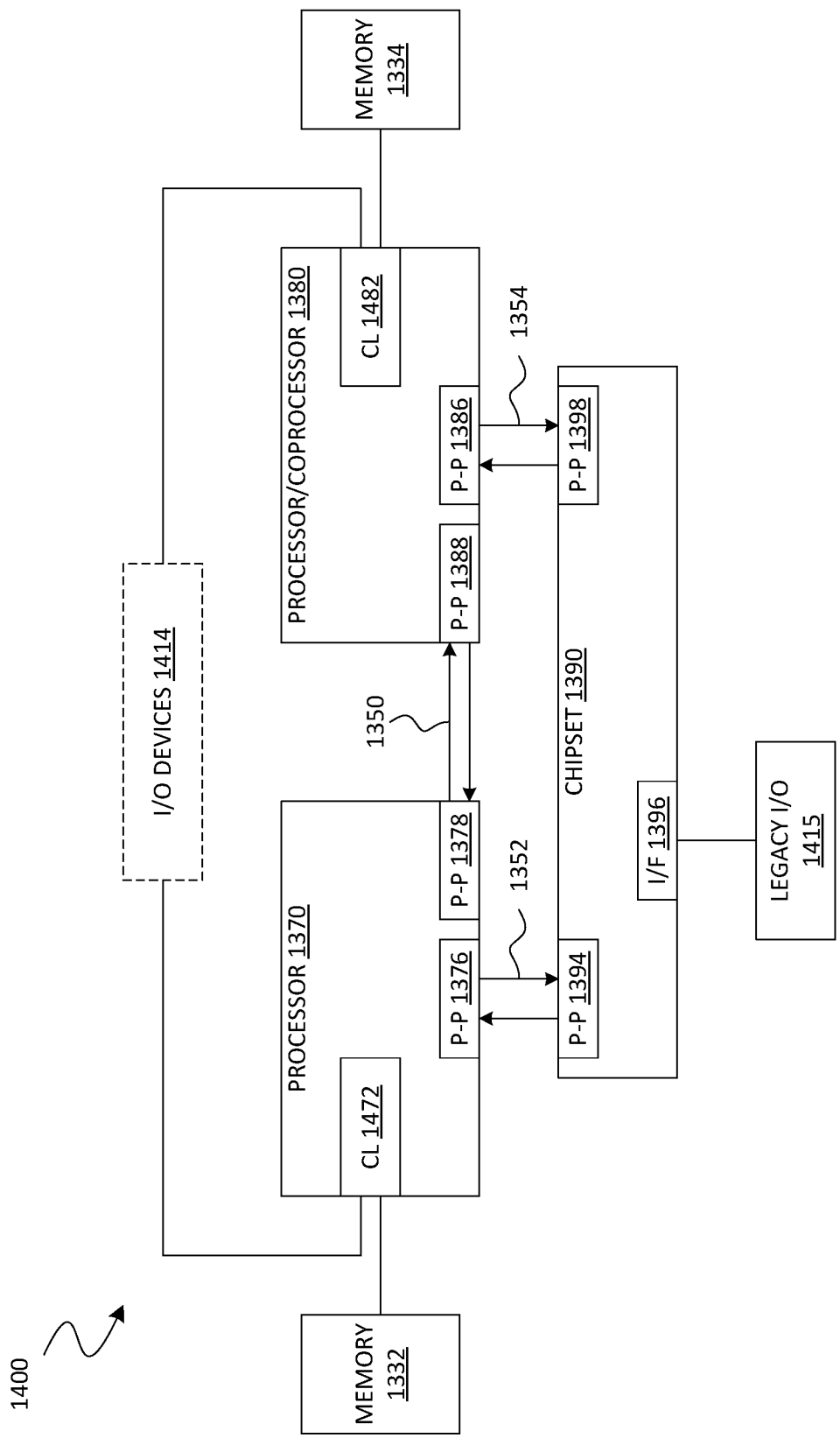

Referring now to FIG. 13, shown is a block diagram of a second more specific exemplary system 1400 in accordance with an embodiment of the present invention. Like elements in FIGS. 12 and 13 bear like reference numerals, and certain aspects of FIG. 12 have been omitted from FIG. 13 in order to avoid obscuring other aspects of FIG. 13.

FIG. 13 illustrates that the processors 1370, 1380 may include integrated memory and I/O control logic ("CL") 1472 and 1482, respectively. Thus, the CL 1472, 1482 include integrated memory controller units and include I/O control logic. FIG. 13 illustrates that not only are the memories 1332, 1334 coupled to the CL 1472, 1482, but also that I/O devices 1414 are also coupled to the control logic 1472, 1482. Legacy I/O devices 1415 are coupled to the chipset 1390.

Referring now to FIG. 14, shown is a block diagram of a SoC 1500 in accordance with an embodiment of the present invention. Similar elements in FIG. 10 bear like reference numerals. Also, dashed lined boxes are optional features on more advanced SoCs. In FIG. 14, an interconnect unit(s) 1502 is coupled to: an application processor 1510 which includes a set of one or more cores 1102A-N and shared cache unit(s) 1106; a system agent unit 1110; a bus controller unit(s) 1116; an integrated memory controller unit(s) 1114; a set or one or more coprocessors 1520 which may include integrated graphics logic, an image processor, an audio processor, and a video processor; an static random access memory (SRAM) unit 1530; a direct memory access (DMA) unit 1532; and a display unit 1540 for coupling to one or more external displays. In one embodiment, the coprocessor(s) 1520 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1330 illustrated in FIG. 12, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

FIG. 15 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 15 shows a program in a high level language 1602 may be compiled using an x86 compiler 1604 to generate x86 binary code 1606 that may be natively executed by a processor with at least one x86 instruction set core 1616. The processor with at least one x86 instruction set core 1616 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1604 represents a compiler that is operable to generate x86 binary code 1606 (e.g., object code) that can, with or without additional linkage processing, be executed on the processor with at least one x86 instruction set core 1616. Similarly, FIG. 15 shows the program in the high level language 1602 may be compiled using an alternative instruction set compiler 1608 to generate alternative instruction set binary code 1610 that may be natively executed by a processor without at least one x86 instruction set core 1614 (e.g., a processor with cores that execute the MIPS instruction set of MIPS Technologies of Sunnyvale, CA and/or that execute the ARM instruction set of ARM Holdings of Sunnyvale, CA). The instruction converter 1612 is used to convert the x86 binary code 1606 into code that may be natively executed by the processor without an x86 instruction set core 1614. This converted code is not likely to be the same as the alternative instruction set binary code 1610 because an instruction converter capable of this is difficult to make; however, the converted code will accomplish the general operation and be made up of instructions from the alternative instruction set. Thus, the instruction converter 1612 represents software, firmware, hardware, or a combination thereof that, through emulation, simulation or any other process, allows a processor or other electronic device that does not have an x86 instruction set processor or core to execute the x86 binary code 1606.

ADDITIONAL NOTES AND EXAMPLES

Example 1 includes a system, comprising two or more sub-non-uniform memory access clusters (SNCs), a processor core, and circuitry communicatively coupled to the two or more SNCs and the processor core, the circuitry to allocate a specified memory space in the two or more SNCs in accordance with a SNC memory allocation policy indicated from a request to initialize the specified memory space.

Example 2 includes the system of Example 1, further comprising a register to store the indicated SNC memory allocation policy.

Example 3 includes the system of any of Examples 1 to 2, wherein the circuitry is further to determine the indicated SNC memory allocation policy based on an instruction that triggered the request to initialize the specified memory space.

Example 4 includes the system of any of Examples 1 to 3, wherein the circuitry is further to override a default memory allocation policy for the two or more SNCs with the indicated SNC memory allocation policy.

Example 5 includes the system of any of Examples 1 to 4, wherein the circuitry is further to determine if the indicated SNC memory allocation policy indicates that the specified memory space is to be interleaved, and, if so determined, allocate the specified memory space to be interleaved among all of the two or more SNCs.

Example 6 includes the system of Example 5, wherein the circuitry is further to allocate the specified memory space to be interleaved among all of the two or more SNCs at a page granularity.

Example 7 includes the system of any of Examples 5 to 6, wherein the circuitry is further to allocate the specified memory space to be interleaved among all of the two or more SNCs at a block granularity.

Example 8 includes an apparatus comprising decode circuitry to decode a single instruction, the single instruction to include a field for an opcode, and execution circuitry to execute the decoded instruction according to the opcode to provide an indicated sub-non-uniform memory access cluster (SNC) memory allocation policy.

Example 9 includes the apparatus of Example 8, wherein the execution circuitry is further to execute the decoded instruction according to the opcode to store information in a register that corresponds to the indicated SNC memory allocation policy.

Example 10 includes the apparatus of any of Examples 8 to 9, wherein the opcode intrinsically specifies the indicated SNC memory allocation policy.

Example 11 includes the apparatus of Example 10, wherein the single instruction further includes a field for an identifier of a source operand and a field for an identifier of a destination operand, and wherein the execution circuitry is further to execute the decoded instruction according to the opcode to retrieve source information from a location indicated by the source operand, and store the source information to a location indicated by the destination operand in accordance with the indicated SNC memory allocation policy.

Example 12 includes the apparatus of Example 11, wherein the execution circuitry is further to execute the decoded instruction according to the opcode to allocate a memory space specified by the destination operand in two or more SNCs in accordance with the indicated SNC memory allocation policy.

Example 13 includes the apparatus of Example 12, wherein the execution circuitry is further to execute the decoded instruction according to the opcode to override a default memory allocation policy for the specified memory space of the two or more SNCs with the indicated SNC memory allocation policy.

Example 14 includes the apparatus of any of Examples 12 to 13, wherein the execution circuitry is further to execute the decoded instruction according to the opcode to determine if the indicated SNC memory allocation policy indicates that the specified memory space is to be interleaved, and, if so determined, allocate the specified memory space to be interleaved among all of the two or more SNCs.

Example 15 includes the apparatus of Example 14, wherein the execution circuitry is further to execute the decoded instruction according to the opcode to allocate the specified memory space to be interleaved among all of the two or more SNCs at a page granularity.

Example 16 includes the apparatus of any of Examples 14 to 15, wherein the execution circuitry is further to execute the decoded instruction according to the opcode to allocate the specified memory space to be interleaved among all of the two or more SNCs at a block granularity.

Example 17 includes a method, comprising fetching an instruction having a field for an opcode, decoding the instruction, scheduling execution of the instruction, and executing the decoded instruction to provide an indicated sub-non-uniform memory access cluster (SNC) memory allocation policy according to the opcode.

Example 18 includes the method of Example 17, further comprising storing information in a register that corresponds to the indicated SNC memory allocation policy.

Example 19 includes the method of any of Examples 17 to 18, wherein the instruction has fields for a destination operand and a source operand, and wherein the opcode intrinsically specifies the indicated SNC memory allocation policy.

Example 20 includes the method of Example 19, further comprising retrieving source information from a location indicated by the source operand, and storing the source information to a location indicated by the destination operand in accordance with the indicated SNC memory allocation policy.

Example 21 includes the method of any of Examples 19 to 20, further comprising allocating a memory space specified by the destination operand in two or more SNCs in accordance with the indicated SNC memory allocation policy.

Example 22 includes the method of Example 21, further comprising overriding a default memory allocation policy for the specified memory space of the two or more SNCs with the indicated SNC memory allocation policy.

Example 23 includes the method of any of Examples 21 to 22, further comprising determining if the indicated SNC memory allocation policy indicates that the specified memory space is to be interleaved, and, if so determined, allocating the specified memory space to be interleaved among all of the two or more SNCs.

Example 24 includes the method of Example 23, further comprising allocating the specified memory space to be interleaved among all of the two or more SNCs at a page granularity.

Example 25 includes the method of any of Examples 23 to 24, further comprising allocating the specified memory space to be interleaved among all of the two or more SNCs at a block granularity.

Example 26 includes an apparatus, comprising means for storing data in two or more sub-non-uniform memory access clusters (SNCs), and means for allocating a specified memory space in the two or more SNCs in accordance with a SNC memory allocation policy indicated from a request to initialize the specified memory space.

Example 27 includes the apparatus of Example 26, further comprising means for storing the indicated SNC memory allocation policy in a register.

Example 28 includes the apparatus of any of Examples 26 to 27, further comprising means for determining the indicated SNC memory allocation policy based on an instruction that triggered the request to initialize the specified memory space.

Example 29 includes the apparatus of any of Examples 26 to 28, further comprising means for overriding a default memory allocation policy for the two or more SNCs with the indicated SNC memory allocation policy.

Example 30 includes the apparatus of any of Examples 26 to 29, further comprising means for determining if the indicated SNC memory allocation policy indicates that the specified memory space is to be interleaved, and, if so determined, means for allocating the specified memory space to be interleaved among all of the two or more SNCs.

Example 31 includes the apparatus of Example 30, further comprising means for allocating the specified memory space to be interleaved among all of the two or more SNCs at a page granularity.

Example 32 includes the apparatus of any of Examples 30 to 31, further comprising means for allocating the specified memory space to be interleaved among all of the two or more SNCs at a block granularity.

Example 33 includes an integrated circuit, comprising circuitry to determine a sub-non-uniform memory access cluster (SNC) memory allocation policy hint that is associated with a request to initialize a specified memory space, and allocate the specified memory space in two or more SNCs in accordance with the SNC memory allocation policy hint.

Example 34 includes the integrated circuit of Example 33, further comprising a register to store the SNC memory allocation policy hint.

Example 35 includes the integrated circuit of any of Examples 33 to 34, wherein the circuitry is further to determine the SNC memory allocation policy hint based on an instruction that triggered the request to initialize the specified memory space.

Example 36 includes the integrated circuit of any of Examples 33 to 35, wherein the circuitry is further to override a default memory allocation policy for the two or more SNCs with a policy indicated by the SNC memory allocation policy hint.

Example 37 includes the integrated circuit of any of Examples 33 to 36, wherein the circuitry is further to determine if the SNC memory allocation policy hint indicates that the specified memory space is to be interleaved, and, if so determined, allocate the specified memory space to be interleaved among all of the two or more SNCs.

Example 38 includes the integrated circuit of Example 37, wherein the circuitry is further to allocate the specified memory space to be interleaved among all of the two or more SNCs at a page granularity.

Example 39 includes the integrated circuit of any of Examples 37 to 38, wherein the circuitry is further to allocate the specified memory space to be interleaved among all of the two or more SNCs at a block granularity.

Example 40 includes a method, comprising determining a sub-non-uniform memory access cluster (SNC) memory allocation policy hint that is associated with a request to initialize a specified memory space, and allocating the specified memory space in two or more SNCs in accordance with the SNC memory allocation policy hint.

Example 41 includes the method of Example 40, further comprising storing the SNC memory allocation policy hint in a register.

Example 42 includes the method of any of Examples 40 to 41, further comprising determining the SNC memory allocation policy hint based on an instruction that triggered the request to initialize the specified memory space.

Example 43 includes the method of any of Examples 40 to 42, further comprising overriding a default memory allocation policy for the two or more SNCs with a policy indicated by the SNC memory allocation policy hint.

Example 44 includes the method of any of Examples 40 to 43, further comprising determining if the SNC memory allocation policy hint indicates that the specified memory space is to be interleaved, and, if so determined, allocating the specified memory space to be interleaved among all of the two or more SNCs.

Example 45 includes the method of Example 44, further comprising allocating the specified memory space to be interleaved among all of the two or more SNCs at a page granularity.

Example 46 includes the method of any of Examples 44 to 45, further comprising allocating the specified memory space to be interleaved among all of the two or more SNCs at a block granularity.

Example 47 includes an apparatus, comprising means for determining a sub-non-uniform memory access cluster (SNC) memory allocation policy hint that is associated with a request to initialize a specified memory space, and means for allocating the specified memory space in two or more SNCs in accordance with the SNC memory allocation policy hint.

Example 48 includes the apparatus of Example 47, further comprising means for storing the SNC memory allocation policy hint in a register.

Example 49 includes the apparatus of any of Examples 47 to 48, further comprising means for determining the SNC memory allocation policy hint based on an instruction that triggered the request to initialize the specified memory space.

Example 50 includes the apparatus of any of Examples 47 to 49, further comprising means for overriding a default memory allocation policy for the two or more SNCs with a policy indicated by the SNC memory allocation policy hint.

Example 51 includes the apparatus of any of Examples 47 to 50, further comprising means for determining if the SNC memory allocation policy hint indicates that the specified memory space is to be interleaved, and, if so determined, means for allocating the specified memory space to be interleaved among all of the two or more SNCs.

Example 52 includes the apparatus of Example 51, further comprising means for allocating the specified memory space to be interleaved among all of the two or more SNCs at a page granularity.

Example 53 includes the apparatus of any of Examples 51 to 52, further comprising means for allocating the specified memory space to be interleaved among all of the two or more SNCs at a block granularity.

Techniques and architectures for providing a SNC-hint together with a request to allocate memory space in the SNC are described herein. In the above description, for purposes of explanation, numerous specific details are set forth in order to provide a thorough understanding of certain embodiments. It will be apparent, however, to one skilled in the art that certain embodiments can be practiced without these specific details. In other instances, structures and devices are shown in block diagram form in order to avoid obscuring the description.

Reference in the specification to "one embodiment" or "an embodiment" means that a particular feature, structure, or characteristic described in connection with the embodiment is included in at least one embodiment of the invention. The appearances of the phrase "in one embodiment" in various places in the specification are not necessarily all referring to the same embodiment.

Some portions of the detailed description herein are presented in terms of algorithms and symbolic representations of operations on data bits within a computer memory. These algorithmic descriptions and representations are the means used by those skilled in the computing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the discussion herein, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Certain embodiments also relate to apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but is not limited to, any type of disk including floppy disks, optical disks, CD-ROMs, and magnetic-optical disks, read-only memories (ROMs), random access memories (RAMs) such as dynamic RAM (DRAM), EPROMs, EEPROMs, magnetic or optical cards, or any type of media suitable for storing electronic instructions, and coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear from the description herein. In addition, certain embodiments are not described with reference to any particular programming language. It will be appreciated that a variety of programming languages may be used to implement the teachings of such embodiments as described herein.

Besides what is described herein, various modifications may be made to the disclosed embodiments and implementations thereof without departing from their scope. Therefore, the illustrations and examples herein should be construed in an illustrative, and not a restrictive sense. The scope of the invention should be measured solely by reference to the claims that follow.

What is claimed is:

1. A system, comprising:
   two or more sub-non-uniform memory access clusters (SNCs);
   a processor core; and
   circuitry communicatively coupled to the two or more SNCs and the processor core, the circuitry to:
   allocate a specified memory space in the two or more SNCs in accordance with a SNC memory allocation policy indicated from a request to initialize the specified memory space.

2. The system of claim 1, further comprising:
   a register to store the indicated SNC memory allocation policy.

3. The system of claim 1, wherein the circuitry is further to:
   determine the indicated SNC memory allocation policy based on an instruction that triggered the request to initialize the specified memory space.

4. The system of claim 1, wherein the circuitry is further to:
   override a default memory allocation policy for the two or more SNCs with the indicated SNC memory allocation policy.

5. The system of claim 1, wherein the circuitry is further to:
   determine if the indicated SNC memory allocation policy indicates that the specified memory space is to be interleaved; and, if so determined,
   allocate the specified memory space to be interleaved among all of the two or more SNCs.

6. An apparatus comprising:
   decode circuitry to decode a single instruction, the single instruction to include a field for an opcode; and
   execution circuitry to execute the decoded instruction according to the opcode to provide an indicated sub-non-uniform memory access cluster (SNC) memory allocation policy.

7. The apparatus of claim 6, wherein the execution circuitry is further to execute the decoded instruction according to the opcode to:
   store information in a register that corresponds to the indicated SNC memory allocation policy.

8. The apparatus of claim 6, wherein the opcode intrinsically specifies the indicated SNC memory allocation policy.

9. The apparatus of claim 8, wherein the single instruction further includes a field for an identifier of a source operand and a field for an identifier of a destination operand, and wherein the execution circuitry is further to execute the decoded instruction according to the opcode to:
   retrieve source information from a location indicated by the source operand; and
   store the source information to a location indicated by the destination operand in accordance with the indicated SNC memory allocation policy.

10. The apparatus of claim 9, wherein the execution circuitry is further to execute the decoded instruction according to the opcode to:
    allocate a memory space specified by the destination operand in two or more SNCs in accordance with the indicated SNC memory allocation policy.

11. The apparatus of claim 10, wherein the execution circuitry is further to execute the decoded instruction according to the opcode to:
    override a default memory allocation policy for the specified memory space of the two or more SNCs with the indicated SNC memory allocation policy.

12. The apparatus of claim 11, wherein the execution circuitry is further to execute the decoded instruction according to the opcode to:
    determine if the indicated SNC memory allocation policy indicates that the specified memory space is to be interleaved; and, if so determined,
    allocate the specified memory space to be interleaved among all of the two or more SNCs.

13. The apparatus of claim 12, wherein the execution circuitry is further to execute the decoded instruction according to the opcode to:
allocate the specified memory space to be interleaved among all of the two or more SNCs at a page granularity.

14. The apparatus of claim 12, wherein the execution circuitry is further to execute the decoded instruction according to the opcode to:
allocate the specified memory space to be interleaved among all of the two or more SNCs at a block granularity.

15. A method, comprising:
fetching an instruction having a field for an opcode;
decoding the instruction;
scheduling execution of the instruction; and
executing the decoded instruction to provide an indicated sub-non-uniform memory access cluster (SNC) memory allocation policy according to the opcode.

16. The method of claim 15, wherein the instruction has fields for a destination operand and a source operand, and wherein the opcode intrinsically specifies the indicated SNC memory allocation policy.

17. The method of claim 16, further comprising:
retrieving source information from a location indicated by the source operand; and
storing the source information to a location indicated by the destination operand in accordance with the indicated SNC memory allocation policy.

18. The method of claim 17, further comprising:
allocating a memory space specified by the destination operand in two or more SNCs in accordance with the indicated SNC memory allocation policy; and
overriding a default memory allocation policy for the specified memory space of the two or more SNCs with the indicated SNC memory allocation policy.

19. The method of claim 18, further comprising:
determining if the indicated SNC memory allocation policy indicates that the specified memory space is to be interleaved; and, if so determined,
allocating the specified memory space to be interleaved among all of the two or more SNCs.

20. The method of claim 19, further comprising:
allocating the specified memory space to be interleaved among all of the two or more SNCs at one of a page granularity and a block granularity.

* * * * *